(12) United States Patent
Aiyama

(10) Patent No.: US 7,903,271 B2
(45) Date of Patent: Mar. 8, 2011

(54) PRINTING SYSTEM, PROGRESS DISPLAY PROCESSING METHOD, COMPUTER READABLE PROGRAM STORAGE MEDIUM AND PROGRAM

(75) Inventor: Kenji Aiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1069 days.

(21) Appl. No.: 10/995,364

(22) Filed: Nov. 24, 2004

(65) Prior Publication Data

US 2005/0141006 A1 Jun. 30, 2005

(30) Foreign Application Priority Data

Dec. 2, 2003 (JP) ................................. 2003-403153

(51) Int. Cl.
*G06F 3/12* (2006.01)
*G06K 15/00* (2006.01)
*G03G 15/00* (2006.01)

(52) U.S. Cl. ...................... 358/1.15; 358/1.13; 358/1.14; 399/8

(58) Field of Classification Search ................. 358/1.13, 358/1.15
See application file for complete search history.

(56) References Cited

U.S. PATENT DOCUMENTS

| | | | |
|---|---|---|---|
| 6,709,176 B2* | 3/2004 | Gotoh et al. ..................... 400/61 |
| 6,791,703 B1 | 9/2004 | Ameda et al. ................. 358/1.15 |
| 7,016,083 B2* | 3/2006 | Kotaka ........................... 358/296 |
| 7,281,019 B2 | 10/2007 | Taketa et al. | |
| 2002/0114006 A1* | 8/2002 | Matoba ......................... 358/1.15 |
| 2002/0145750 A1 | 10/2002 | Honda et al. .................. 358/1.15 |
| 2003/0105738 A1 | 6/2003 | Taketa et al. | |
| 2003/0142348 A1* | 7/2003 | Hiramatsu et al. ............ 358/1.15 |
| 2004/0006522 A1* | 1/2004 | Keane et al. ..................... 705/35 |
| 2004/0125398 A1 | 7/2004 | Aiyama ........................ 358/1.14 |
| 2004/0186801 A1* | 9/2004 | Morita ............................. 705/32 |
| 2004/0228639 A1* | 11/2004 | Badovinac et al. ............... 399/8 |

FOREIGN PATENT DOCUMENTS

| | | |
|---|---|---|
| JP | 62-255053 | 11/1987 |
| JP | 6-348310 | 12/1994 |
| JP | 8-314982 | 11/1996 |
| JP | 11176715 A | 7/1999 |
| JP | 2000-357144 | 12/2000 |
| JP | 2001-47710 | 2/2001 |
| JP | 2003-36162 | 2/2003 |
| JP | 2003098910 A * | 4/2003 |
| JP | 2003-196444 | 7/2003 |

* cited by examiner

*Primary Examiner* — Mark K Zimmerman
*Assistant Examiner* — Fan Zhang
(74) *Attorney, Agent, or Firm* — Fitzpatrick, Cella, Harper & Scinto

(57) ABSTRACT

To display appropriately the progress status for each processing device in one series of print operations so that the person in charge of each processing device may visually confirm the status. A management server transmits the processing information adapted to one series of print operations to any of the processing devices, collects the notification information notified from each processing device, generates the display data for displaying relevantly the progress status of each print operation and the process state of each processing device, and transmits the generated display data to each processing device. Each processing device acquires the display data transmitted from the management server, and displays and switches dynamically the progress status of the processing devices in linkage with a processing device selected from among a plurality of processing devices.

18 Claims, 18 Drawing Sheets

| | |
|---|---|
| PRE-OPERATION DISPLAY DATA | JOB ID OF IN-PROC JOB OF PRE-OPERATION |
| | STATE OF PRE-OPERATION DEVICE |
| | JOB PROGRESS STATUS IN PRE-OPERATION |
| BASIC DISPLAY DATA | JOB ID OF IN-PROC JOB |
| | STATE OF DEVICE |
| | JOB PROGRESS STATUS |
| POST-OPERATION DISPLAY DATA | JOB ID OF IN-PROC JOB IN POST-OPERATION |
| | STATE OF POST-OPERATION DEVICE |
| | JOB PROGRESS STATUS OF POST-OPERATION |

| OPERATION ID | PROC CONTENT | DEVICE OR PERSON IN CHARGE OF PROC |
|---|---|---|
| 0 | RIP | RIP DEVICE 102 |
| 1 | PRINTING | PRINT DEVICE 103 |
| 2 | DELIVERY | DELIVERER 104 |
| 3 | FINISHING | FINISHING DEVICE 105 |

FIG. 15

| | |
|---|---|
| DISPLAY DATA FOR OPERATION 0 | JOB ID OF IN-PROC JOB |
| | OPERATION 0 DISPLAY DATA |
| | POST-OPERATION DISPLAY DATA |
| DISPLAY DATA FOR OPERATION 1 | JOB ID OF IN-PROC JOB |
| | PRE-OPERATION DISPLAY DATA |
| | OPERATION 1 DISPLAY DATA |
| | POST-OPERATION DISPLAY DATA |
| ⋮ | |
| DISPLAY DATA FOR OPERATION N | JOB ID OF IN-PROC JOB |
| | PRE-OPERATION DISPLAY DATA |
| | OPERATION N DISPLAY DATA |

FIG. 16

| OPERATION ID | PROC CONTENT | DEVICE OR PERSON IN CHARGE OF PROC |
|---|---|---|
| 0 | RIP | RIP DEVICE 102 |
| 1 | PRINTING | PRINT DEVICE 103 |
| 2 | FINISHING | FINISHING DEVICE 105 |

| | |
|---|---|
| PRE-OPERATION DISPLAY DATA | JOB ID OF IN-PROC JOB OF PRE-OPERATION |
| | STATE OF PRE-OPERATION DEVICE |
| | JOB PROGRESS STATUS IN PRE-OPERATION |
| BASIC DISPLAY DATA | JOB ID OF IN-PROC JOB |
| | STATE OF DEVICE |
| | JOB PROGRESS STATUS |
| POST-OPERATION DISPLAY DATA | JOB ID OF IN-PROC JOB IN POST-OPERATION |
| | STATE OF POST-OPERATION DEVICE |
| | JOB PROGRESS STATUS OF POST-OPERATION |

| HOST NAME OF PRE-OPERATION DEVICE | rip-server1 |
|---|---|
| PROC INFORMATION | JOB ID |
| | PRINT SETTING PARAMETER |
| HOST NAME OF POST-OPERATION DEVICE | finisher1 |

| JOB ID OF IN-PROC JOB OF PRE-OPERATION |
|---|
| STATE OF PRE-OPERATION DEVICE |
| JOB PROGRESS STATUS IN PRE-OPERATION |

FIG. 29

STORAGE MEDIUM SUCH AS FD, CD-ROM, OR THE LIKE

| DIRECTORY INFORMATION |
|---|
| 1ST DATA PROC PROGRAM<br>PROGRAM CODE GROUP CORRESPONDING TO STEPS IN FLOW CHARTS OF FIG. 10 |
| 2ND DATA PROC PROGRAM<br>PROGRAM CODE GROUP CORRESPONDING TO STEPS IN FLOW CHARTS OF FIG. 12 |
| 3RD DATA PROC PROGRAM<br>PROGRAM CODE GROUP CORRESPONDING TO STEPS IN FLOW CHARTS OF FIG. 13 |
| 4TH DATA PROC PROGRAM<br>PROGRAM CODE GROUP CORRESPONDING TO STEPS IN FLOW CHARTS OF FIG. 14 |
| 5TH DATA PROC PROGRAM<br>PROGRAM CODE GROUP CORRESPONDING TO STEPS IN FLOW CHARTS OF FIG. 19 |
| 6TH DATA PROC PROGRAM<br>PROGRAM CODE GROUP CORRESPONDING TO STEPS IN FLOW CHARTS OF FIG. 27 |
| |

MEMORY MAP OF STORAGE MEDIUM

PRINTING SYSTEM, PROGRESS DISPLAY PROCESSING METHOD, COMPUTER READABLE PROGRAM STORAGE MEDIUM AND PROGRAM

BACKGROUND OF THE INVENTION

1. Field of the Invention

The present invention relates to a printing system, a progress display processing method, a computer readable program storage medium and a program in which a management server and a plurality of processing devices for performing different printing processes can be communicated.

2. Related Background Art

These days, on the market dealing with large amounts of copies or jobs, called a print on demand (POD), there are increasing cases of employing a digital print, instead of printing, to perform the print process, in which digitalization is more merged than in the conventional printing industry, and the computer management and control have spread and approached a certain level of the printing industry, using the computer.

Also, there is a service called a Fulfillment, which collectively executes all the affairs from placing or accepting an order for merchandise in the database marketing such as a mail order sale to packing, delivery, after-service, inventory management and payment management.

Moreover, a centralized management system called an MIS (Management Information System) supports the corporate planning and management affairs through collection, processing and report of production related data and accumulates the information to provide it to the required station, when needed. And this management information system supports the service of Fulfillment, employing a format called JDF (Job Definition Format), as means of communication as defined in the activities of an organization called CIP4 (International Cooperation For Integration of Processes in Prepress, Press and Post-press).

On the other hand, the internet has come to the age of broad band, and a service called an ASP (Application Service Provider) market has appeared and may be linked with the POD market in the future.

However, in the consumer environments, the small scale offices especially for small-to-medium-sized enterprises do not afford to purchase the multi-functional MFP's. There are many cases where the action of printing or ordering is not taken immediately due to high threshold as the actual problem, even though there is a demand for creating a bound brochure, a print with plate, a large amount of prints in short term, or a direct mail.

Also, in the print market for producing a catalogue, a pamphlet or a book with the above system, it is common as a work form to create the original data through a desk-top publishing for editing the print original with the computer, print the data, and make a post-process including cutting and bookbinding in recent years.

In recent years, there have been offered several print operation management schemes such as a management information system (MIS) for managing a series of works associated with the printing using the computer to reduce the cost and improve the productivity, a job definition format (JDF) describing the process content in each print operation, and CIP4 defining the information passed between devices in charge of each print operation.

For example, a print job brought into the print dealer is managed by the management information system, the operator decides the process to be performed in each of an RIP operation for generating the image data to be printed, a print operation for printing the image on the paper and a bookbinding operation for cutting and bookbinding, defines the process content of each operation in JDF, and transmits the defined process content to the device in charge of each operation, and each device performs the process of operation in accordance with the transmitted process content, whereby a series of print operations are managed, as already disclosed in Japanese Patent Application Laid-Open No. 2003-036162 and Japanese Patent Application Laid-Open No. 2001-047710.

Particularly, Japanese Patent Application Laid-Open No. 2003-036162 is concerned with a system for supporting the production of printed matter in which a plurality of participants are involved.

In Japanese Patent Application Laid-Open No. 2003-036162, an example was described in which the management of print operation is performed by a server on the internet, a work flow is defined in a printed matted production work, and the device in charge of each operation performs the process of operation in accordance with the definitions.

Also, in Japanese Patent Application Laid-Open No. 2001-047710, a graphical user interface for providing a job ticket or the print job information regarding the print system was described in which the state information of each device is acquired by communicating with each resource or device and the state of device is displayed clearly, indicating whether or not there are plenty of resources involving the print operation, for example, there is enough toner for printer, or there is no problem in the condition of a finisher making the bookbinding process.

However, in Japanese Patent Application Laid-Open No. 2003-036162, it is possible to input the processing information of each print operation, but difficult to display the state of device in charge of each operation clearly.

Also, in Japanese Patent Application Laid-Open No. 2001-047710, it is possible to display the state of each device, but not possible to visually display the pre- and post-operations in the print operation of each device, whereby the manager can not grasp the job status dynamically.

Therefore, as the overall system, there is a problem that the operator who operates the device in charge of the process of each operation, which is processed separately and independently, can not grasp the schedule progress status, such as how long another time it takes to complete the pre-operation, or whether or not the post-operation can accept the next job immediately.

And the operator of each device can not judge whether or not the adjustment work of device or another job with lower priority can be performed ahead, whereby it is difficult to improve the overall work efficiency.

SUMMARY OF THE INVENTION

It is an object of this invention to provide a printing system, a progress display processing method, a computer readable program storage medium and a program.

Also, it is another object of the invention to provide a print system, a progress display processing method, a computer readable program storage medium and a program in which the user of each processing device mutually monitors the progress status of each processing device in one series of print operations, and the person in charge visually confirms the progress status of print operation as the overall system to manage the process status of each operation as divided work at will, while checking the progress status of each processing device itself, thereby greatly improving the processing efficiency of the system.

Other features and objects of the present invention will become apparent from the following description taken in conjunction with the accompanying drawings and the appended claims.

BRIEF DESCRIPTION OF THE DRAWINGS

FIG. 15 is a view for explaining the data structure of operation display data produced by the management server as shown in FIG. 1;

FIG. 16 is a view for explaining the structure of operation management information managed by the management server as shown in FIG. 1;

FIG. 29 is a view for explaining a memory map of a storage medium storing various data processing programs that can be read by an image processing apparatus according to the invention.

DESCRIPTION OF THE PREFERRED EMBODIMENTS

The best mode for carrying out the present invention will be described below with reference to the accompanying drawings.

The preferred embodiments of the invention will be described below with reference to the accompanying drawings.

First Embodiment

First, the outline of a system according to the first embodiment of the invention will be explained.

Figure 1:
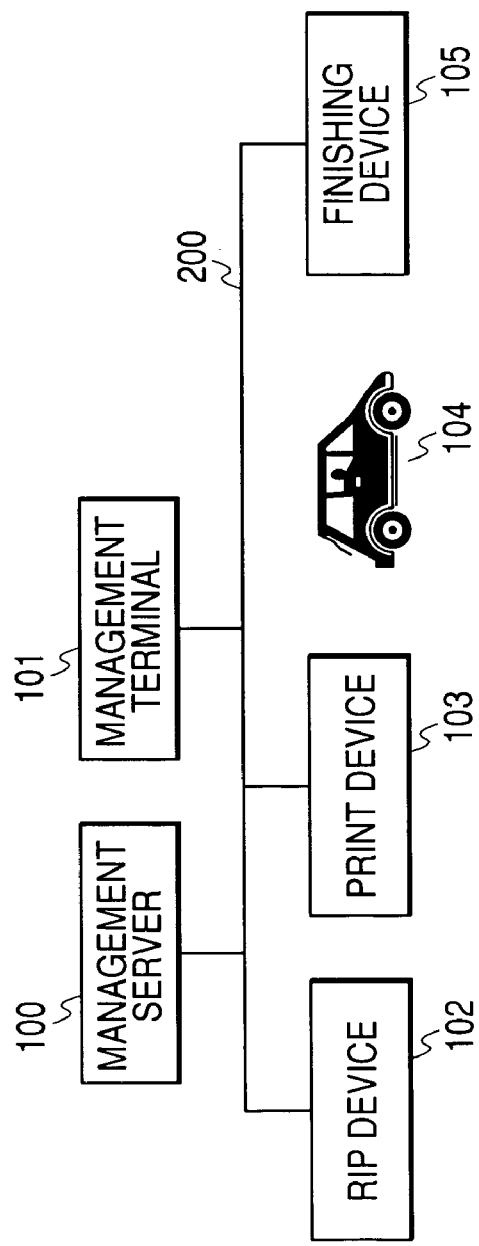
FIG. 1 is a block diagram showing one example of the configuration of an image processing system according to the first embodiment of the present invention.
Figure 2:
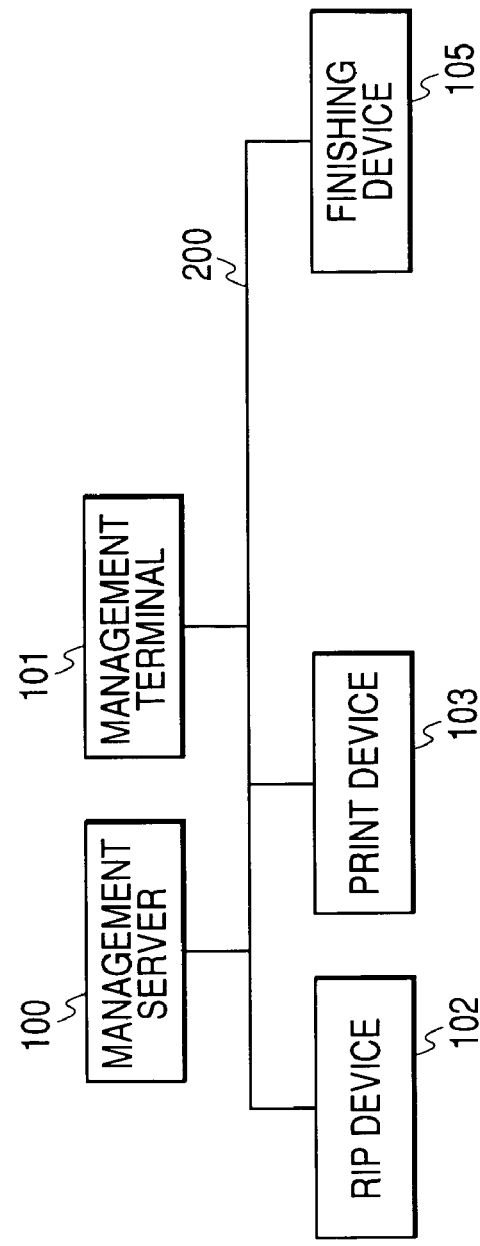
FIG. 2 is a block diagram showing another example of the configuration of the image processing system according to the first embodiment of the invention.

FIGS. 1 and 2 are block diagrams showing one example of an image processing system according to the first embodiment of the invention. FIG. 1 is a case where a print processing operation includes an RIP operation, a printing operation, a delivery operation and a finishing operation, and FIG. 2 is a case where the print processing operation includes an RIP operation, a printing operation and a finishing operation.

In FIGS. 1 and 2, reference numeral 100 designates a management server that receives a print job from an external device, creates a print operation required to process the print job automatically or by an operation of the operator, generates the processing information for instructing the process content of each print operation, receives the state information and the job process status from the device or person in charge of each print operation of the print job, generates the display data for controlling a status display screen from the received state information and job process status, transmits it to the external device, and manages the overall print operation of the print job.

Reference numeral 101 designates a management terminal having a display unit such as a liquid crystal screen for displaying the characters or graphics, a touch panel, contained in the display unit, for acquiring the coordinates of a touched part, communication means for receiving the display data generated by the management server 100, and control means for controlling the entire system of the terminal. The characters and graphics are displayed on the display unit, based on the received display data, the coordinates of touched position on the touch panel are detected, and the display is switched according to the coordinates of touched position.

Reference numeral 102 designates an RIP device that receives the processing information for RIP device from the management server 100, and generates the image data for printing from the received processing information. 103 designates a print device that receives the image data generated in the RIP device 102 and forms the print image on the paper.

Reference numeral 104 designates delivery means that delivers the printed matter printed by the print device from a location where the print device 103 is installed to another location in FIG. 1. 105 designates a finishing device that cuts the printed matter printed by the print device 103 or performs the bookbinding process in accordance with various bookbinding rules.

Reference numeral 200 designates a network that is an information communication path linking the management server 100, the management terminal 101, the RIP device 102, the print device 103, the deliverer 104, and the finishing device 105, and may be the Ethernet (registered trademark), for example.

The print device 103, the deliverer 104 and the finishing device 105, like the RIP device 102, receive a process to be performed in each operation as the processing information from the management server 100, and perform the corresponding process.

FIGS. 3 to 9 are views showing one example of an operation progress status screen displayed on the display unit of the management terminal 101 as shown in FIGS. 1 and 2. The operation progress status screen corresponds to a display screen on which the progress status of a specific device (RIP device 102, print device 103, etc.) as shown in FIGS. 1 and 2, and the status of pre-operation and post-operation of the print operation of which the device is in charge are displayed and switched by the tab.

Each display screen as shown in FIGS. 3 to 9 may be controlled for display in the management terminal having display means for displaying the status of a plurality of devices without regard to the mode of the display unit in this embodiment.

Also, the display means contains the touch panel on the display unit, the touched location on the panel is inputted as the coordinates, when touched, so that the control (including a switching control for the display screen) is enabled according to the input coordinates.

This status display screen is varied depending on what the device of notice is, or what device is required for the print job, and the typical screens are shown in FIGS. 4 to 9.

In FIGS. 3 to 9, 3 designates an RIP tab for displaying the status of RIP operation, 4 designates a print tab for displaying the status of print operation, 5 designates a delivery tab for displaying the status of delivery operation, 6 designates a finishing tab for displaying the status of finishing operation, 2 designates a job ID number for uniquely specifying the job in process or scheduled to start to process at the next time in the device, and 7 to 13 designate message display examples for the status of device and the status of device in charge of the pre-operation or post-operation, in which the display contents are changed depending on the job process status.

Also, when the RIP tab 3, the print tab 4, the delivery tab 5 and the finishing tab 6 are touched, the screen is changed to display the status of the corresponding operation.

Figure 10:
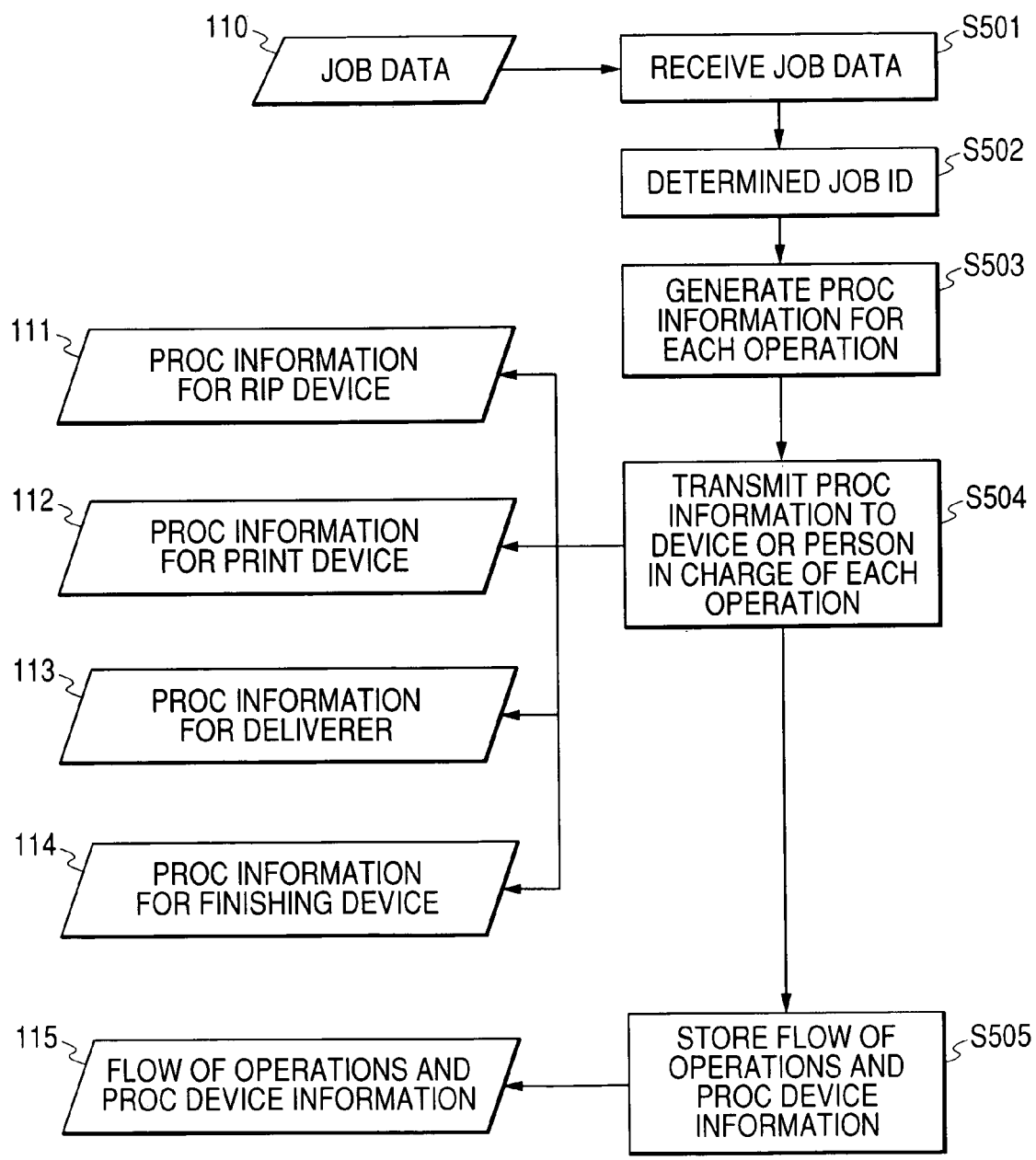
FIG. 10 is a flowchart showing one example of a first data processing procedure in the image processing system according to the invention.

FIG. 10 is a flowchart showing one example of a first data processing procedure in the image processing system according to the invention. This flowchart corresponds to a flow of a print job accepting process that is performed when the management server 100 receives a print job from the external device, not shown, for example.

First of all, the management server 100 receives a print job from the external device in FIG. 1. In the system of this embodiment, the supply path of the print job is adaptable to both a route via the network 200 and a media route for CD-R or the like.

If the management server 100 receives the print job, a print job receiving program is started, as shown in FIG. 10. Herein, the operation of the print job receiving program for the management server 100 at the time of receiving the print job will be described along the flowchart.

The management server 100 receives the print job (job data) from the external device (S501). This print job includes the process contents of job called a job ticket and the printing data written in a page description language.

The job ticket includes a description for specifying the image processing in the RIP process and the information concerning various processes required for the print operation such as the number of copies, and the process contents of the finishing process.

And at step S501, the print job ID for uniquely specifying the received print job is decided (S502).

And a list of print operations required to process the print job is produced from the job ticket information contained in the print job, the device or person in charge of each operation is decided, and the processing information intended for each operation to define the contents of process in each print operation is generated (S503). The processing information intended for each operation includes the job ID of the print job and the definition of process in each processing operation.

Then, the processing information 111 to 114 intended for each operation that are generated at step S503 are transmitted to the device or terminal of person in charge of each operation (S504).

At step S503, the decided print operation and the operation data 115 for the device or person in charge of each operation are stored. For example, they are stored as the table data as listed in FIG. 11 (S505).

Figures 11, 12:
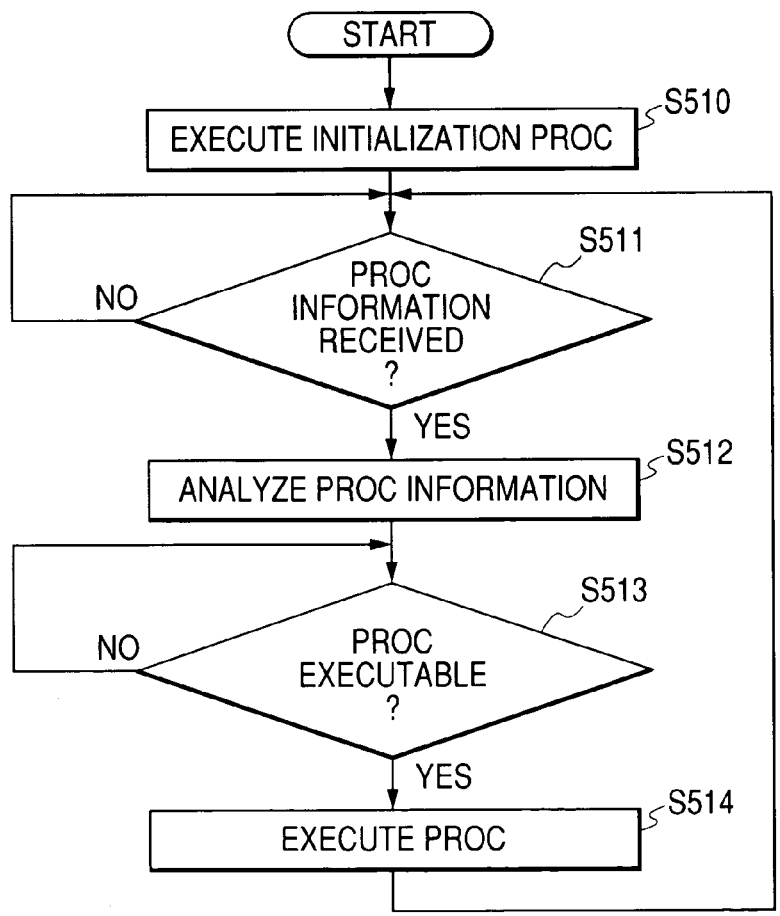
FIG. 11 is a diagram showing one example of an operation data table managed by a management server as shown in FIGS. 1 and 2.
FIG. 12 is a flowchart showing one example of a second data processing procedure in the image processing system according to the invention.

FIG. 11 is a view showing one example of an operation data table managed by the management server 100 as shown in FIGS. 1 and 2.

As listed in FIG. 11, the operation data has in association the operation ID corresponding to the sequence of operation, the process contents in each operation, and the device or person in charge of each print operation.

In this manner, the print job received in the management server 100 is processed.

For example, the image data is generated by making the RIP for the data in the page description language with the job ticket information contained in the received print job, and printed on the paper by the print device, in which if the bookbinding of saddle stitching is specified, the RIP process, the printing process and the finishing process are needed.

And when the finishing operation with saddle stitching bookbinding can not be processed only at another site, it is required that the job is delivered to the site where the finishing device is installed, after the print is completed, as shown in FIG. 1.

In this case, the print operation requires the RIP operation, the print operation (the delivery operation) and the finishing operation.

Thus, the management server 100 performs a process for deciding the device or person that performs each operation.

For example, when it is decided that the RIP operation, the print operation, the delivery operation and the finishing operation are processed by the RIP device 102, the print device 103, the deliverer 104 and the finishing device 105, each operation involves the operation ID, the process contents, and the device or person in charge of process, which are held and managed as the table data in the management server 100 by a controller of the management server 100, until the print job is completed, as shown in FIG. 11.

Referring to FIG. 12, the operation when the device in charge of each print operation receives the processing information from the management server 100 will be described below.

FIG. 12 is a flowchart showing one example of a second data processing procedure in the image processing system according to the invention. This flowchart corresponds to a data processing procedure when the device in charge of each print operation (RIP device 102, print device 103, etc., as shown in FIG. 1) receives the processing information from the management server 100. S510 to S514 indicate the steps.

When started, each device performs an initialization process required for the internal process and communication with the external device (S510).

And it is confirmed whether or not the processing information is issued from the management server 100. If issued, the processing information is received, or if not issued, each device waits for the processing information to be issued from the management server 100 (S511).

And the processing information received at step S511 is analyzed to generate the information for controlling the device (S512). Then, it is determined whether or not the process of the device can be started, based on the generated information for controlling the device (S513). The step S513 is repeated until the process can be started.

This is a step for waiting until the process of pre-operation is completed, for example.

And if the process can be started at step S513, the process is started based on the information for controlling the device that is generated at step S512 (S514), and the procedure returns to step S511.

For example, the processing information for the print operation generated for the print device 103 by the management server 100 includes the job ID of the print job, which of the image data produced by the RIP device 102 is the image data for the print job, the paper size for printing, the number of copies for each page, and the printing on one side or both sides.

The print device 103 receives and analyzes this processing information, and decides the process content for the job having the job ID.

And if there is no print job to be performed ahead and the image data to be printed in the print job is sent from the RIP device 102, the process for the print job is started.

Figure 13:
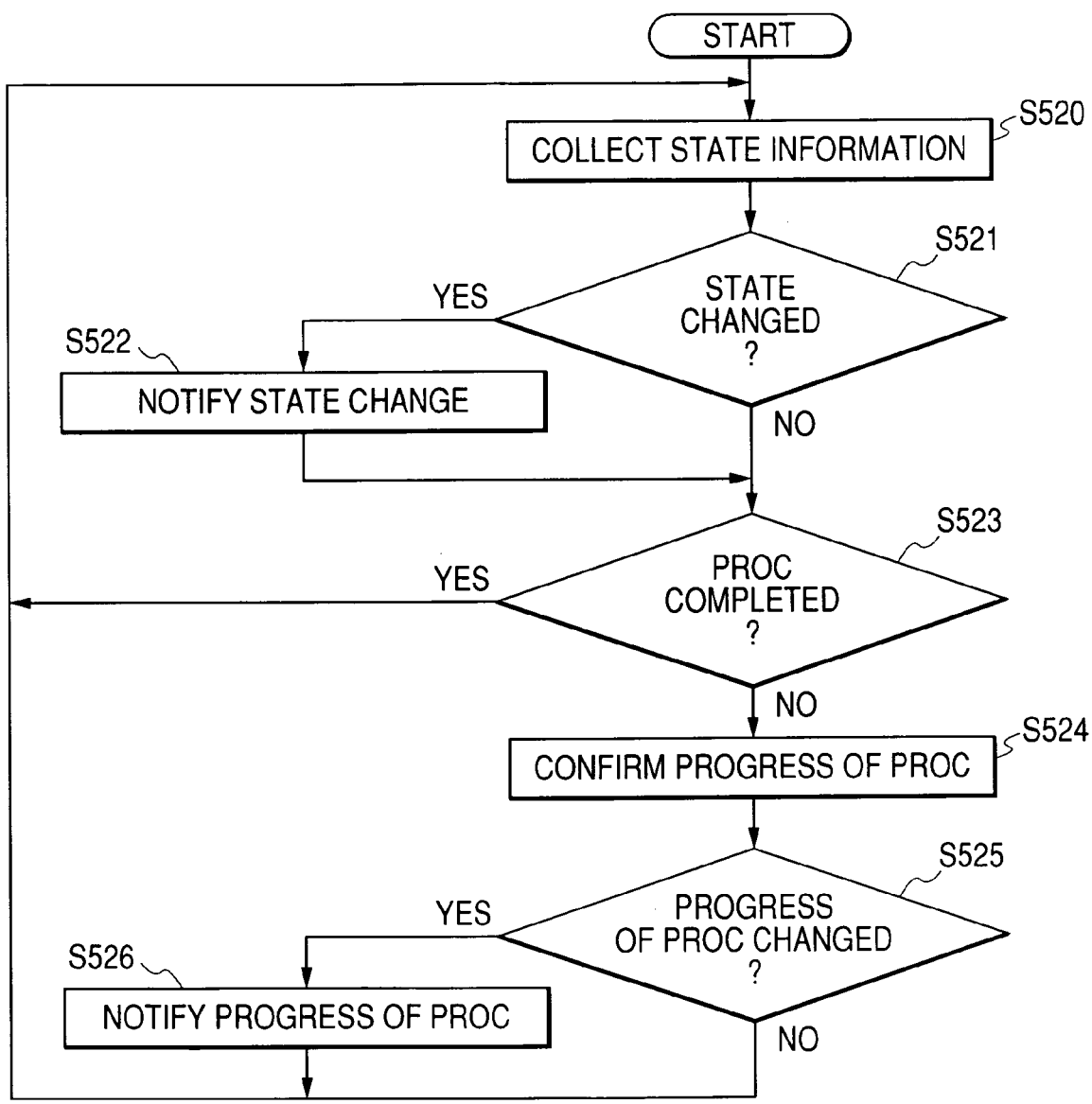
FIG. 13 is a flowchart showing one example of a third data processing procedure in the image processing system according to the invention.

Referring now to FIG. 13, a process example of a program for notifying the state of the device and the process status of job to the management server 100 in the device in charge of each print operation will be described below.

FIG. 13 is a flowchart showing one example of a third data processing procedure in the image processing system according to the invention. This flowchart corresponds to a notification processing procedure when the state of the device and the process status of job are notified to the management server 100 in the device in charge of each print operation. S520 to S525 indicate the steps. This processing program starts the operation when the device in charge of each print operation is started.

First of all, the information of the state of the device is collected (S520). For example, the presence of paper jam, the remaining amount of paper and the presence of error in the print device 103 are detected using various kinds of sensors within the device.

Then, it is determined whether or not the state of the device detected at step S520 is different from the previously detected state (which is held and managed in a memory, not shown) (S521). If it is determined that the state is changed, the state after change is transmitted to the management server 100 (S522), and the procedure proceeds to step S523.

On the other hand, if it is determined that the state is not changed at step S521, or if it is determined that there is no job in execution at present (S523) as a result of determining whether or not there is any job in execution at present (S523) after notification at step S522, the procedure returns to step S520, while if it is determined that there is any job in execution at present, the process progress status of job in execution at present is confirmed (S524).

For example, in how long another minutes the print job in execution at present is completed in the print device is confirmed.

And it is determined whether or not there is any change at the present step S525 from the process progress status confirmed at the previous step S524. If it is determined that there is no change, the procedure returns to step S520.

On the other hand, if it is determined that the progress status of the process is changed at step S525, the progress status of the job process in execution at present that is confirmed at step S524 and the job ID of the job are transmitted to the management server 100 (S526), and the procedure returns to step S520.

In the device in charge of each operation in the above manner, the state of the device and the progress status of job in execution at present are transmitted to the management server 100 by performing the process in accordance with the flowchart as shown in FIG. 13.

Referring to a flowchart of FIG. 14, a process for the management server 100 to generate the display data will be described below.

Figure 14:
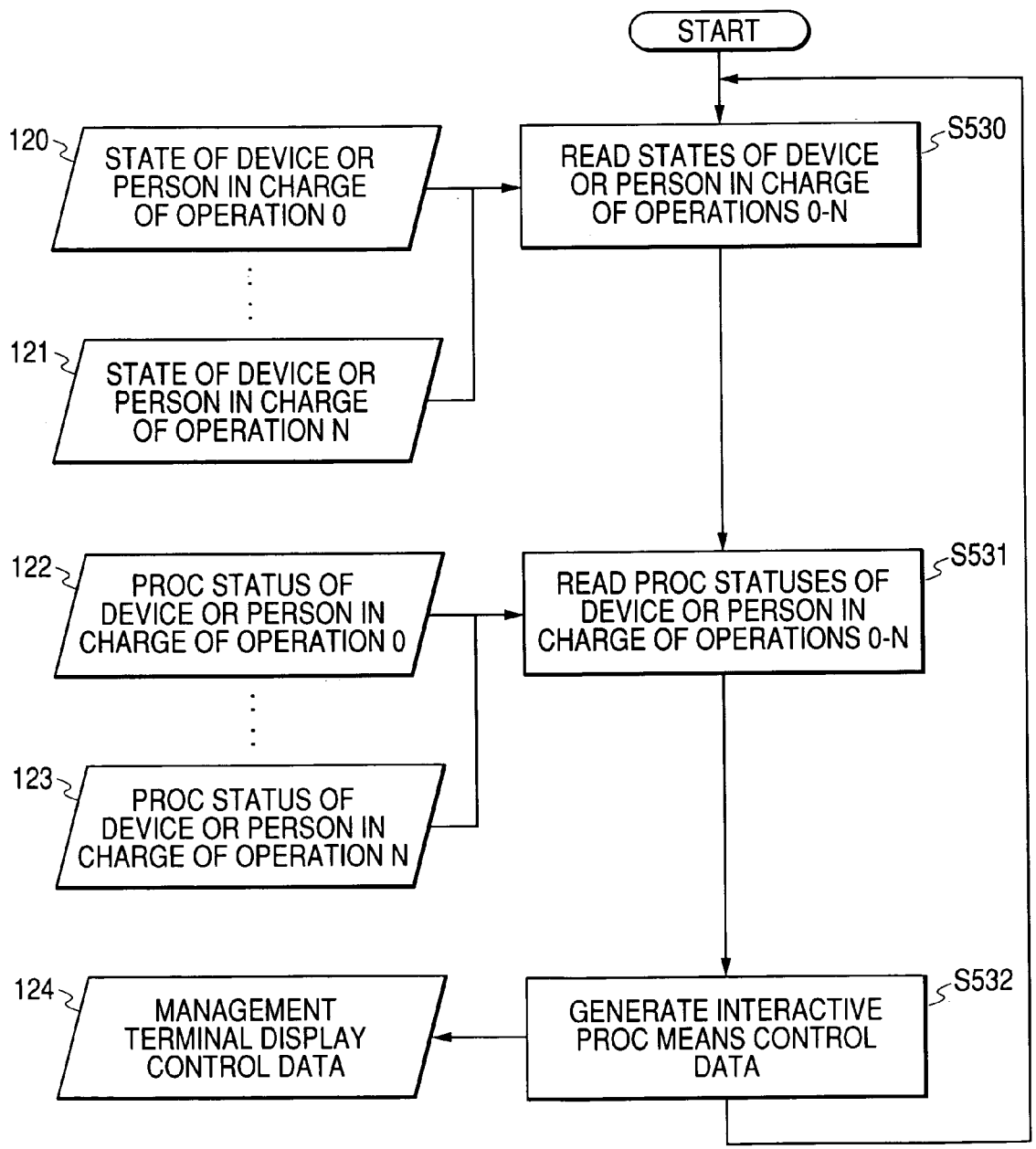
FIG. 14 is a flowchart showing one example of a fourth data processing procedure in the image processing system according to the invention.

FIG. 14 is a flowchart showing one example of a fourth data processing procedure in the image processing system according to the invention. This flowchart corresponds to a processing procedure (generation program) for generating the data for controlling the display of the management terminal 101 from the state information of the device in charge of each operation in the management server 100 and the progress status information of the job in execution at present from the device in charge of each operation. S530 to S532 indicate the steps.

The state information of each device in charge of each operation and the process progress status of the job in execution at present in each device in charge of each operation are periodically transmitted to the management server 100 in accordance with the program of the flowchart as shown in FIG. 13. The management server 100 receives and stores them in the storage device.

First of all, the state information of each device transmitted from each device (e.g. print device 103 as shown in FIG. 1) in charge of each operation is read (S530). And the process status information concerning the print job in execution at present in each device that is transmitted from each device in charge of each operation is read in (S531).

And the interactive processing means control data 124 as shown in FIG. 15 to be employed for display control in the management terminal 101 is generated, based on the state information 120, 121 of each device read at step S530 and the process status information 122, 123 concerning the print job in execution at present in each device that is read at step S531 (S532), and the procedure returns to step S530.

FIG. 15 is a view for explaining the data structure of operation display data that is generated in the management server 100 as shown in FIG. 1. This data corresponds to the display data (interactive processing means control data) generated at step S532 as shown in FIG. 14.

As listed in FIG. 15, the interactive processing means control data in this embodiment has the data structure as shown in FIG. 15. This data structure is divided into the operations along the flow of print operation, and the display data for each operation includes the job ID of the job in process at present in that operation, the display data for that operation, and the display data for the pre-operation and post-operation.

The devices making up the image processing system according to this embodiment and the flow of data process (program) operating within the device have been described above. The specific print job processes (the first print job process requires the RIP operation, the print operation, the delivery operation and the finishing operation) will be described below.

If a print job is transmitted to the management server 100, the management server 100 decides the job ID of the job, generates the processing information for each operation, and transmits the processing information for each operation to the device in charge of each operation in accordance with a control procedure (program) as shown in FIG. 10.

These are the RIP device processing information 111, the print device processing information 112, the deliverer processing information 113, and the finishing device processing information 114, as shown in FIG. 10. These processing information are transmitted via the network 200 to each device.

Also, the management server 100 stores the flow of operation and the information of the processing device in charge of each operation in the storage device. The information corresponds to the flow of operation and the processing device information 115, as shown in FIG. 10. The structure of stored data is the list structure of operation required to complete the print job, as shown in FIG. 11. This list has the operation ID assigned according to the sequence of operations, in which the process content and the device in charge of the process of the operation are defined for each operation.

And the processing information for each operation, which is transmitted from the management server 100 to the device in charge of each operation, is transferred via the network 200 to the RIP device 102, the print device 103, the deliverer 104 and the finishing device 105.

The RIP device 102 performs the RIP process based on the received processing information in accordance with a control procedure as shown in FIG. 12.

Also, the state information and the process status information of the job in execution are transmitted to the management server 100 in accordance with a control procedure (program) as shown in FIG. 13, irrespective of whether or not the RIP process is being executed.

The print device 103, the deliverer 104 and the finishing device 105 also transmit the state information and the process status information of the job in execution to the management server 100.

The management server 100 stores the state information transmitted from the device in charge of each operation and the process status information of the job in execution, generates the management terminal display control data 124 based on the state information from the device in charge of each operation and the process status information of the job in execution in accordance with a control procedure (program) as shown in FIG. 14, and transmits it to the management terminal 101.

In this management terminal display control data 124, the state information and the process status information of the job in execution, which are transmitted from the device in charge of each operation, are successively updated by repeating the steps S530 to S532 as shown in FIG. 14, and transmitted to the management terminal 101.

The management terminal 101 receives the management terminal display control data transmitted from the management server 100, and displays the state of each device in the print system, along with the status of pre-operation and post-operation of the operation of which the device is in charge, on the display unit. Also, the display is switched in accordance with an input of the operator on the touch panel contained in the display unit.

Referring to FIGS. 3 to 9, the operation management status display processing examples displayed in the management terminal 101 will be described below.

Figure 3:
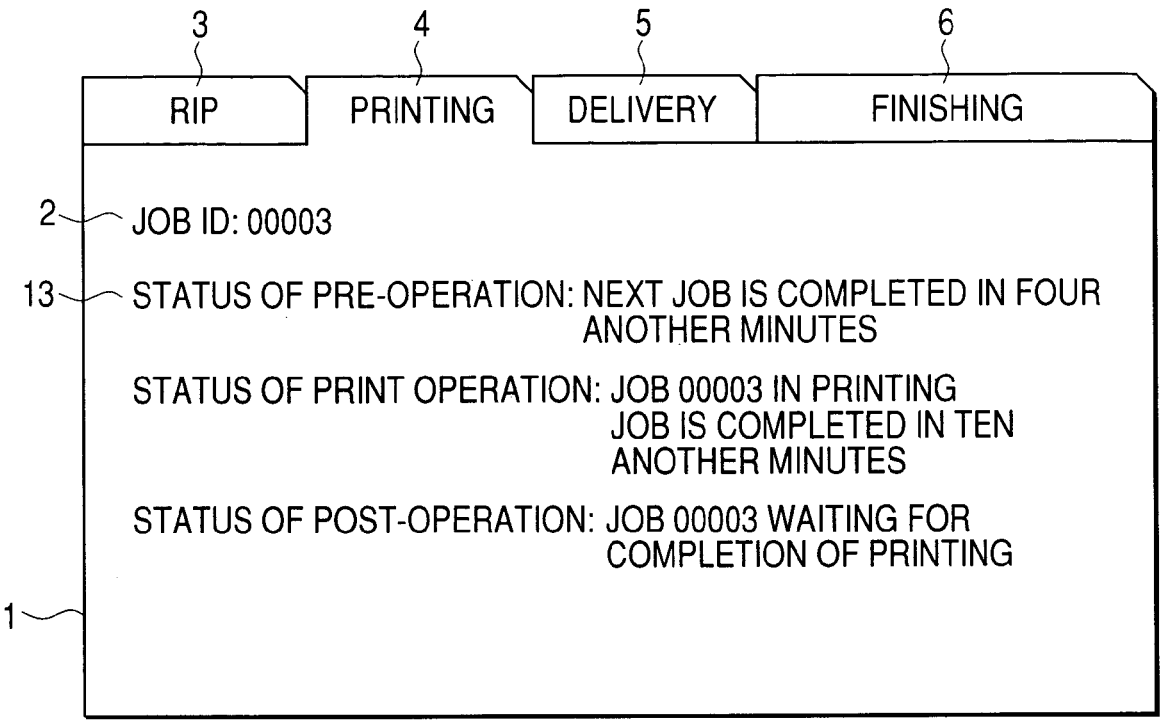
FIG. 3 is a view showing one example of an operation progress status screen displayed on a display device of a management terminal as shown in FIGS. 1 and 2.

An operation management status display processing example as shown in FIG. 3 corresponds to the display of the status of print operation in the management terminal 101, in which the upper tabs reflect the data structure of interactive processing means control data as shown in FIG. 15, and are arranged in the order of RIP tab 3, print tab 4, delivery tab 5 and finishing tab 6 in the processing sequence of each print operation.

Also, the job ID display unit 2 displays the job ID of the job in execution at present in the device in charge of the operation, for example, the job ID of the print operation, namely, the print job in process at present in the print device 103 in FIG. 3.

Reference numeral 16 designates an area for displaying the progress status in the print operation, in which the schematic progress statuses of pre-operation and post-operation of the print operation are displayed along with the progress status of print operation. The operator of the print operation can confirm the progress status of the print operation by checking the display content of this area 16.

When it is desired to confirm the status of the RIP operation that is pre-operation of the print operation, the operator can confirm the progress status of the RIP operation by depressing the RIP tab 3 displayed on the screen. Also, when it is desired to confirm the status of the delivery operation that is post-operation of the print operation, the operator can confirm the progress status of the delivery operation by depressing the delivery tab 5.

Figure 4:
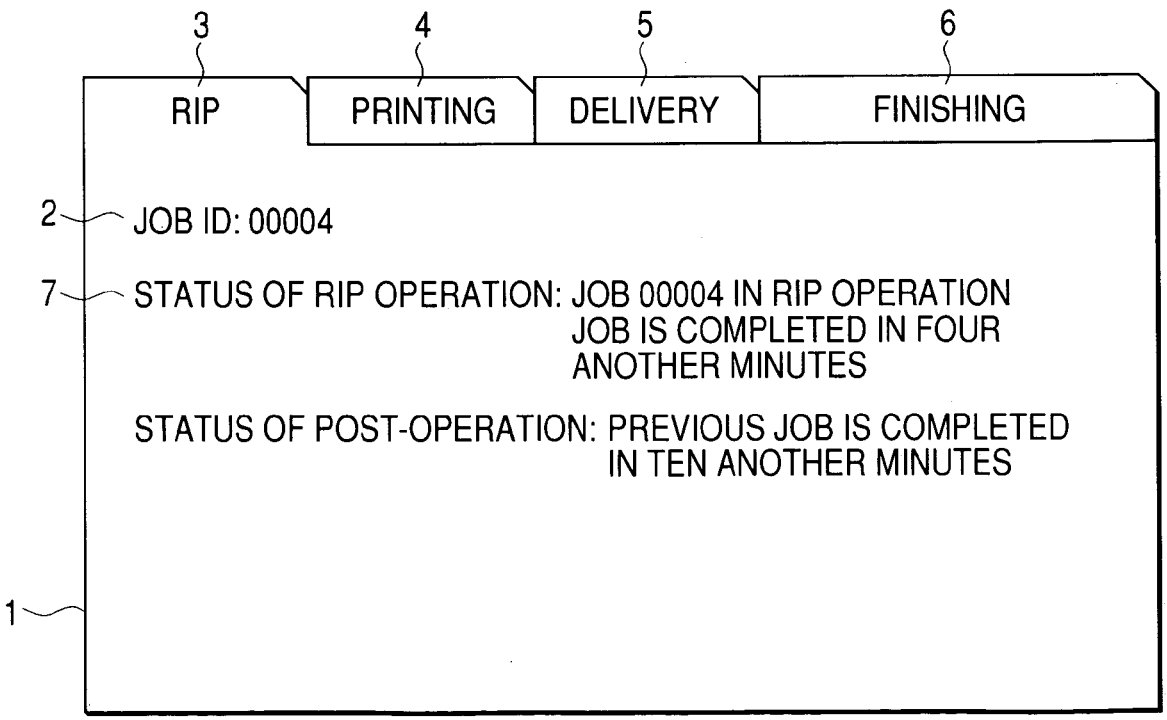
FIG. 4 is a view showing another example of the operation progress status screen displayed on the display device of the management terminal as shown in FIGS. 1 and 2.
Figure 5:
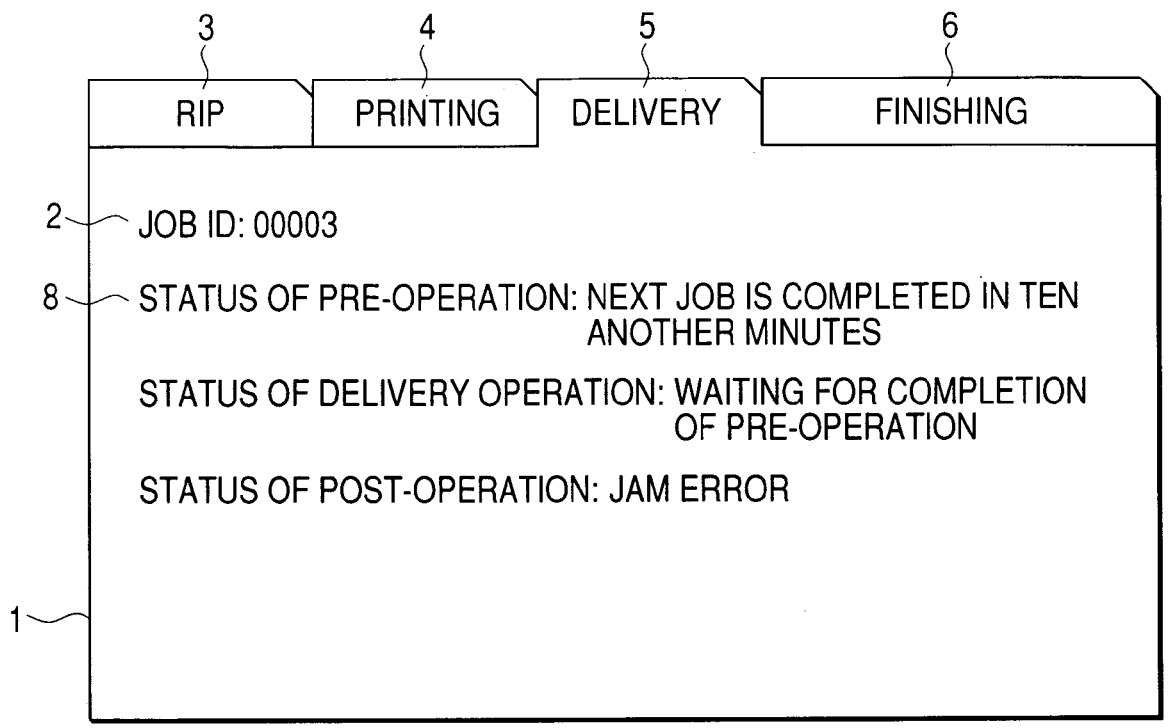
FIG. 5 is a view showing another example of the operation progress status screen displayed on the display device of the management terminal as shown in FIGS. 1 and 2.
Figure 6:
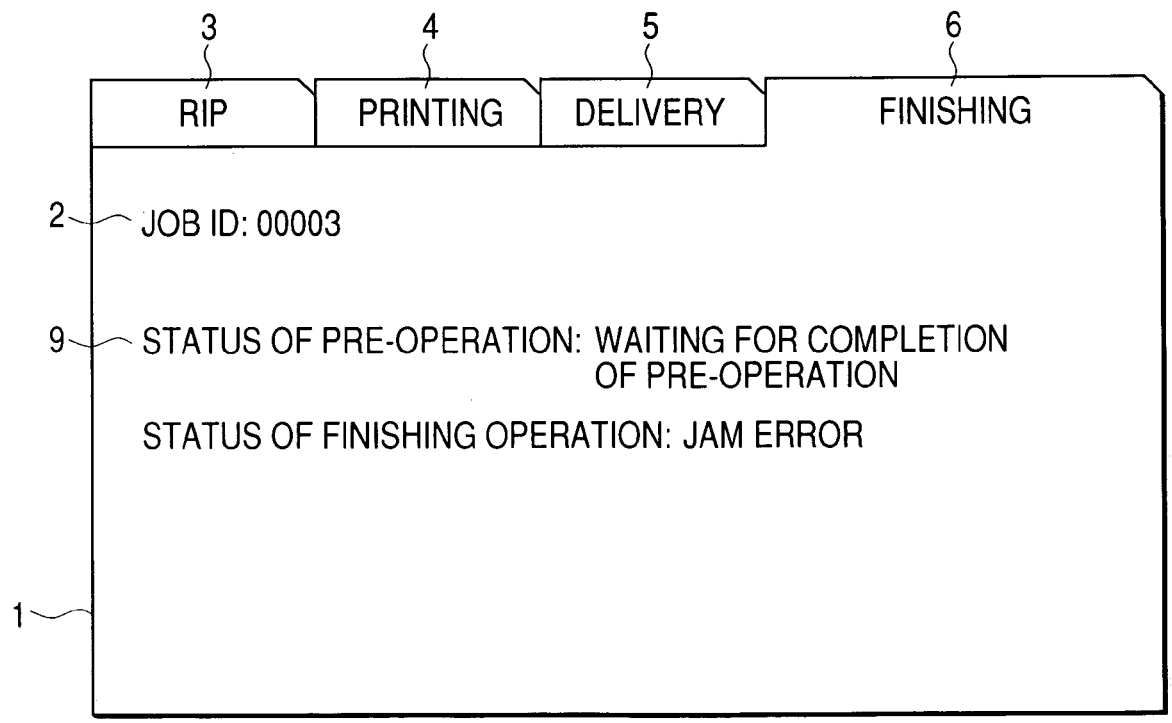
FIG. 6 is a view showing another example of the operation progress status screen displayed on the display device of the management terminal as shown in FIGS. 1 and 2.

FIGS. 3 to 4 are display examples in depressing any one of the RIP tab 3, the print tab 4, the delivery tab 5 and the finishing tab 6. In particular, FIG. 3 is a display example of displaying the state of the print device 103 and the progress status of the job, the state of the RIP device 102 and the progress status of the job as the pre-operation, and the progress status of the delivery operation that is post-operation. FIG. 4 is a display example of displaying the state of the RIP device 102 and the progress status of the job, and the state of the print device 103 and the progress status of the job as the post-operation. FIG. 5 is a display example of displaying the state of the deliverer and the progress status of delivery, the state of the print device 103 and the progress status of the job as the pre-operation, and the state of the finishing device 105 and the progress status of the job as the post-operation.

All these displays are controlled by the management terminal 101 based on the interactive processing means control data as shown in FIG. 15.

And the display is switched by depressing the RIP tab 3, the print tab 4, the delivery tab 5 and the finishing tab 6.

By referring to this display screen, the operator of the device in charge of each operation can adjust the device while confirming the state of pre-operation and post-operation of the operation and the progress status of the job, or take a rest.

An operation status display example in processing a second print job will be described below.

The second print job is the print job requiring the RIP operation, the print operation and the finishing operation.

In this case, the configuration of the devices required to complete the printed matter is shown in FIG. 2, in which the required print operation involves the RIP operation, the print operation and the finishing operation.

In this case, if a print job is transmitted to the management server 100, the management server 100 decides the job ID of the job in accordance with a control procedure (program) as shown in FIG. 10, generates the processing information for each operation, and transmits the processing information for each operation to the device in charge of each operation.

These are the RIP device processing information 111, the print device processing information 112 and the finishing device processing information 114, as shown in FIG. 10. These processing information are transmitted via the network 200 to each device.

Also, the management server 100 stores the flow of operation and the information of the processing device in charge of each operation in the storage device. The information corresponds to the flow of operation and the processing device information 115, as shown in FIG. 10. The structure of stored data is the list structure of operation required to complete the print job, as shown in FIG. 16. This list has the operation ID assigned according to the sequence of operations, in which the process content and the device in charge of the process of the operation are defined for each operation.

FIG. 16 is a view for explaining the structure of operation management information managed in the management server 100 as shown in FIG. 1. The process content and the device or person in charge of process are managed as the list structure, based on each operation ID.

And the processing information for each operation that is transmitted from the management server 100 to the device in charge of each operation is transferred via the network 200 to the RIP device 102, the print device 103 and the finishing device 105.

The RIP device 102 performs the RIP process based on the received processing information in accordance with a control procedure as shown in FIG. 12. Also, the state information and the process status information of the job in execution are transmitted to the management server 100, irrespective of whether or not the RIP process is being executed.

Also, the print device 103 and the finishing device 105 similarly transmit the state information and the process status information of the job in execution to the management server 100.

The management server 100 stores the state information and the process status information of the job in execution that are transmitted from the device in charge of each operation in the storage device, generates the management terminal display control data 124 based on the state information and the process status information of the job in execution from the device in charge of each operation in accordance with a control procedure as shown in FIG. 14, and transmits it to the management terminal 101.

In this management terminal display control data 124, the state information and the process status information of the job in execution, which are transmitted from the device in charge of each operation, are successively updated by repeating the steps S530 to S532 as the control procedure as shown in FIG. 14, and transmitted to the management terminal 101.

The management terminal 101 receives the management terminal display control data transmitted from the management server 100, and displays the state of each device in the print system, along with the status of pre-operation and post-operation of the operation of which the device is in charge, on the display unit. Also, the display is switched in accordance with an input of the operator on the touch panel contained in the display unit.

Figure 7:
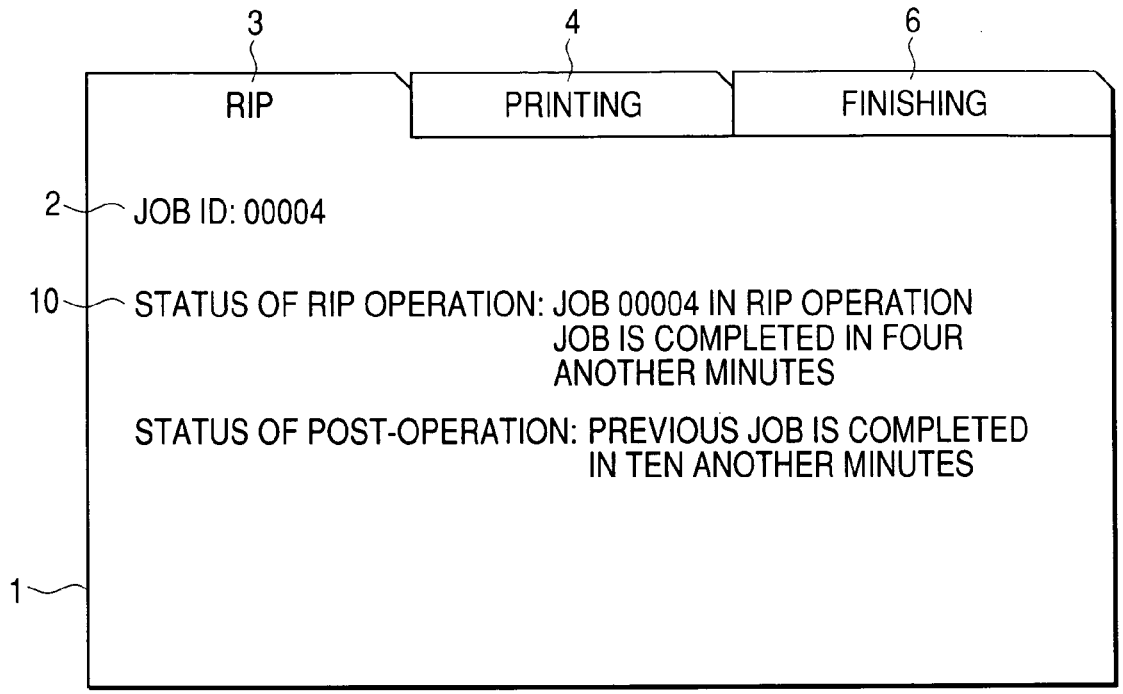
FIG. 7 is a view showing another example of the operation progress status screen displayed on the display device of the management terminal as shown in FIGS. 1 and 2.
Figure 8:
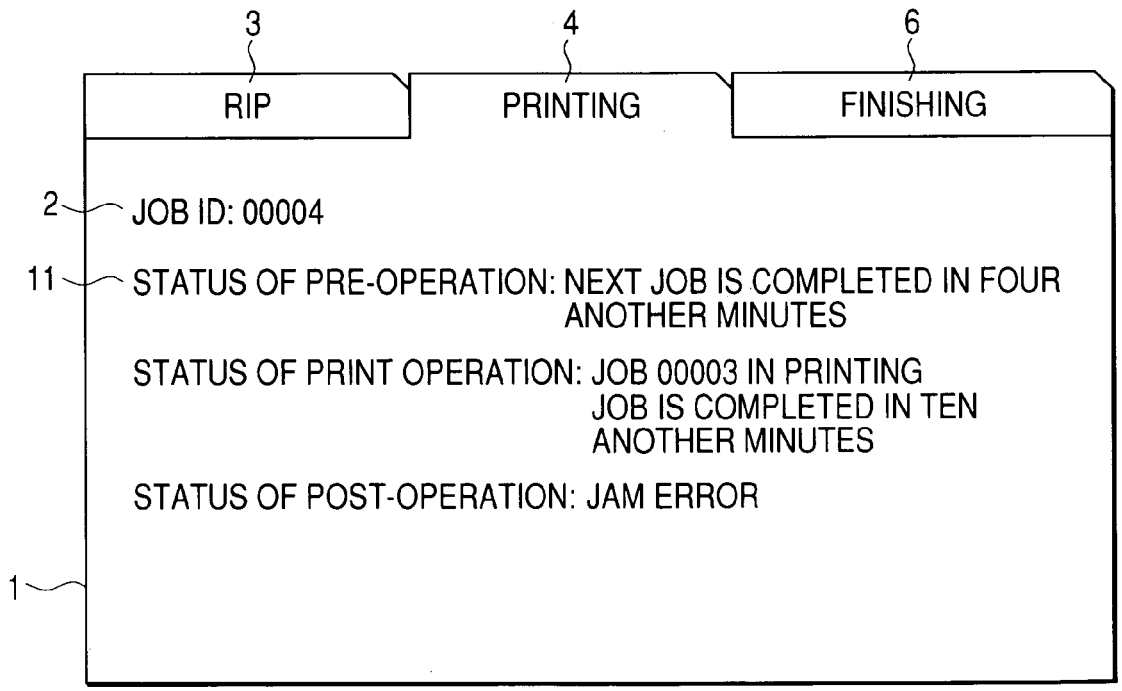
FIG. 8 is a view showing another example of the operation progress status screen displayed on the display device of the management terminal as shown in FIGS. 1 and 2.
Figure 9:
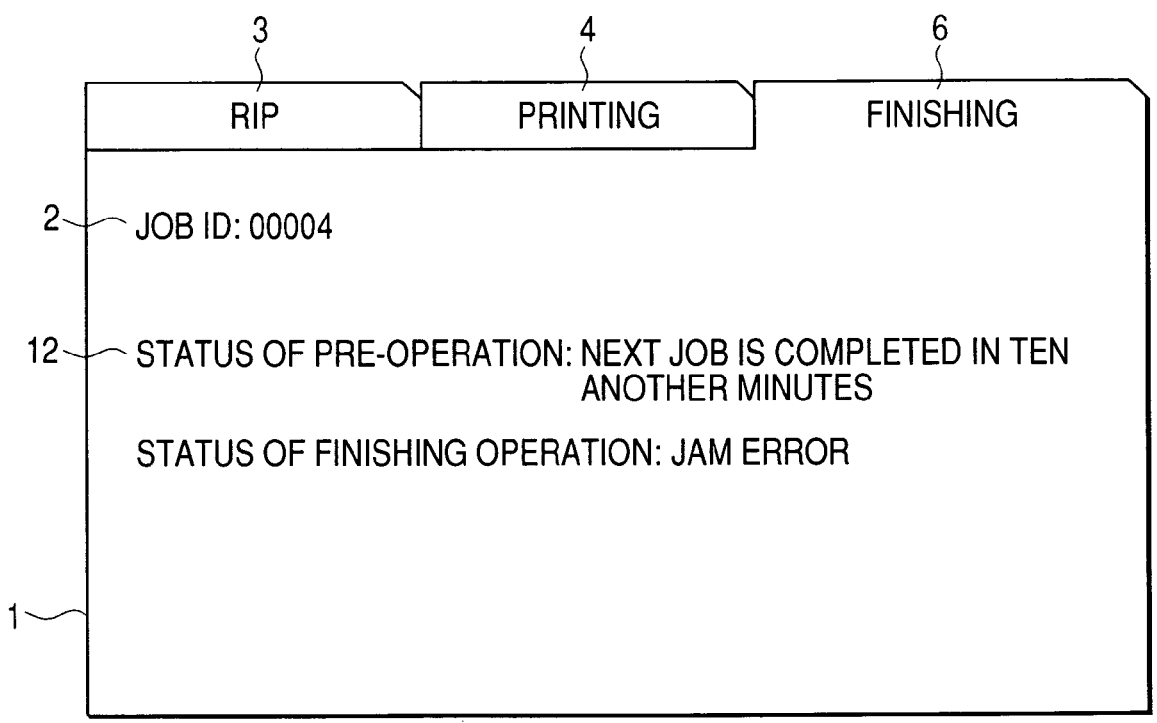
FIG. 9 is a view showing another example of the operation progress status screen displayed on the display device of the management terminal as shown in FIGS. 1 and 2.

A display example in the management terminal 101 is a screen display example as shown in FIGS. 7 to 9. Since the required operations are RIP operation, print operation and finishing operation, the displayed tabs are RIP tab 3, print tab 4 and finishing tab 6.

The state of the device in charge of the operation and the progress status of job and the states of the devices in charge of the pre-operation and post-operation and the progress status of job are displayed for each tab in the same manner as in the first job processing example.

As described above, according to this embodiment, the management server 100 generates the management terminal display control data corresponding to the sequence of operations, based on the state of the device in charge of each operation and the progress status of job that are required for processing the print job, transfers it to the management terminal 101, and displays the state of the device in charge of each operation and the progress status of job in consideration of pre-operation and post-operation in the management terminal 101.

The operator who operates each device visually checks the progress status on the display screen of the management terminal 101 connectable for communication with the network 200 in terms of the UI screen as shown in FIGS. 3 to 8, in consideration of the pre-operation and post-operation, and can easily confirm the state of the device in charge of pre-operation and post-operation for the device in one's charge and the progress status of job, thereby adjusting the device accordingly or taking a rest to increase the overall productivity.

Second Embodiment

Though in the first embodiment, the management server 100 and any number of management terminals 101, to which the operator of each operation makes connection, are connected via the network 200 to construct a system, in which the management terminal 101 receives the UI data produced based on the progress information of each operation gathered by the management server 100 to enable the operator to confirm the progress status of each operation at present and the progress statuses of pre-operation and post-operation of each operation, the invention may be applicable to a system having no management terminal 101. In the following, the second embodiment will be described.

The second embodiment is different from the first embodiment in that the state of each device and the progress status of job, the state of the device in charge of pre-operation and post-operation and the progress status of job, are displayed on the display unit (comprising a display screen of the operation unit).

Figure 17:
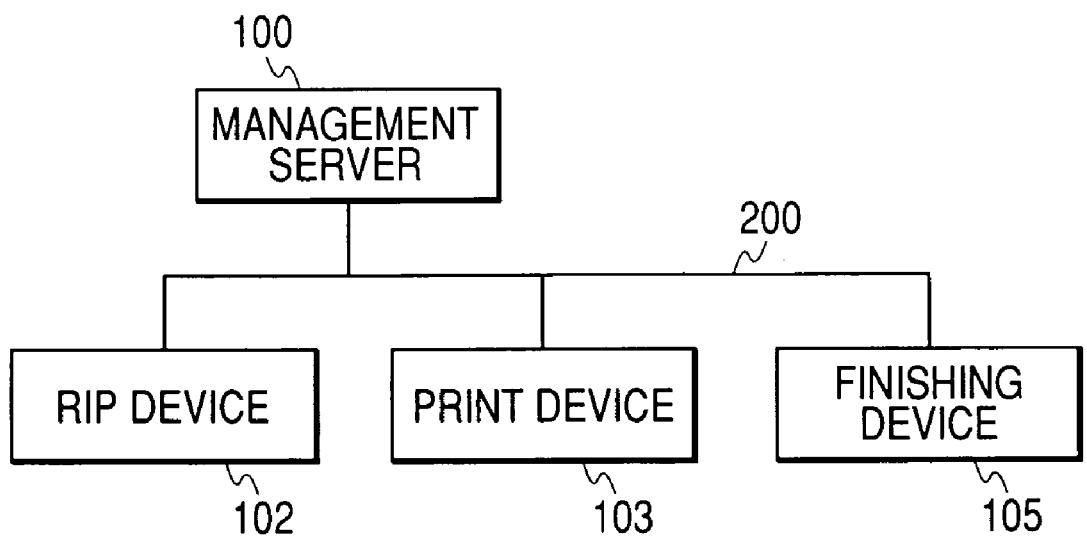
FIG. 17 is a block diagram for explaining the configuration of an image processing system according to the second embodiment of the invention.

FIG. 17 is a block diagram for explaining the configuration of an image processing system according to the second embodiment of the invention. The same numerals are attached to the same parts as in FIG. 1.

Figure 18:
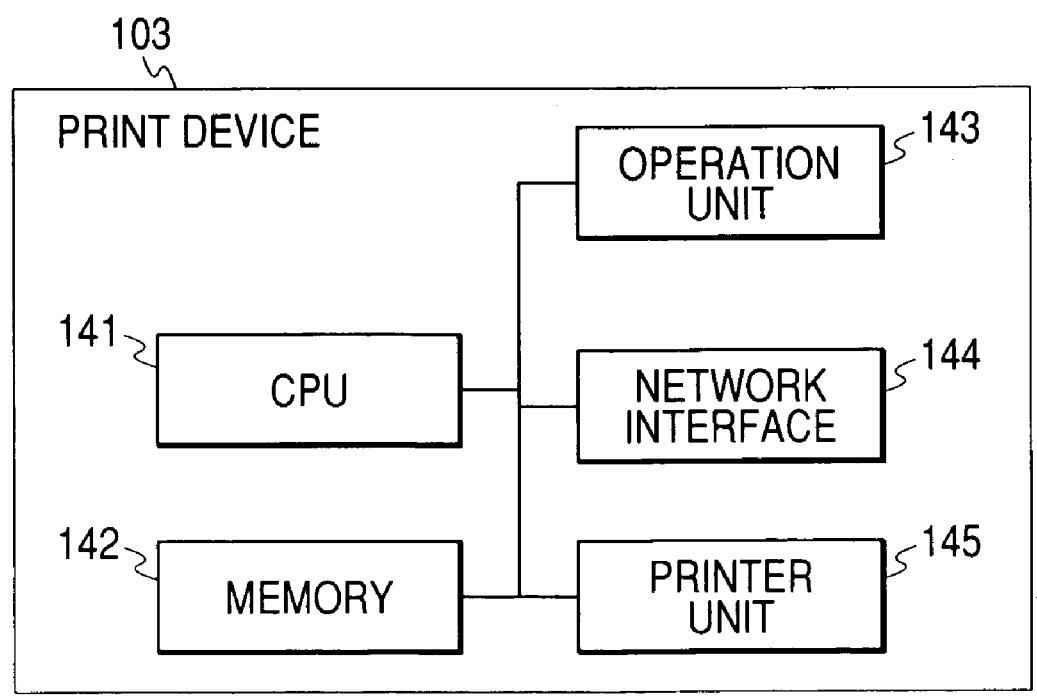
FIG. 18 is a schematic block diagram for explaining the configuration of a print device as shown in FIG. 17.

FIG. 18 is a schematic block diagram for explaining the configuration of a print device 103 as shown in FIG. 17.

In FIG. 18, reference numeral 141 designates a CPU that comprehensively controls each part by loading various control programs stored in a ROM or an external storage device (hard disk), not shown, into a memory 142. The memory 142 may have an area functioning as a work memory for storing the image data for printing and a VRAM for storing the image data (UI data) received from the management server 100.

Reference numeral 143 designates an operation unit having a display unit for displaying the characters or graphics, and input means such as a touch panel incorporated into the display unit, in which the image data (UI data) received from the management server 100 is displayed on the display unit, as will be described later. Reference numeral 144 designates a network interface as communication means with the external device to enable communication in a prescribed protocol with the management server 100. Reference numeral 145 designates a printer unit for performing the printing process, in which the received image data is outputted to a printer engine to record the image on the recording medium.

The print device 103 receives the processing information and the image data used for printing via the network interface 144 from the external device. And the received processing information and the current data are temporarily stored in the memory 142, the external data is transferred based on the processing information from the memory 142 to the printer unit 145, and the image is formed on the paper by the printer unit 145.

Also, the CPU 141 functions as a processor that executes a program for controlling the entire print device 103. Also, the operation unit 143 visually displays the state of the print device 103, and accepts the input of the operator.

In this second embodiment, the management server 100 receives a print job from the outside (data processing device of requester), analyzes the received print job, decides a print operation required to complete the print job, decides the device corresponding to each print operation (including the RIP device 102, the print device 103 and the finishing device 105 as shown in FIG. 17), generates the processing information defining the process content of each device, transmits it to the device in charge of each operation, and performs the processing according to the processing information transmitted from the management server 100 in each device in the same manner as in the first embodiment. Also, each device transmits the state of the device and the progress status of job in process to the management server 100 in the same manner as in the first embodiment. Therefore, the explanation for the control procedure as shown in FIGS. 10, 12 and 13 is omitted.

Figure 19:
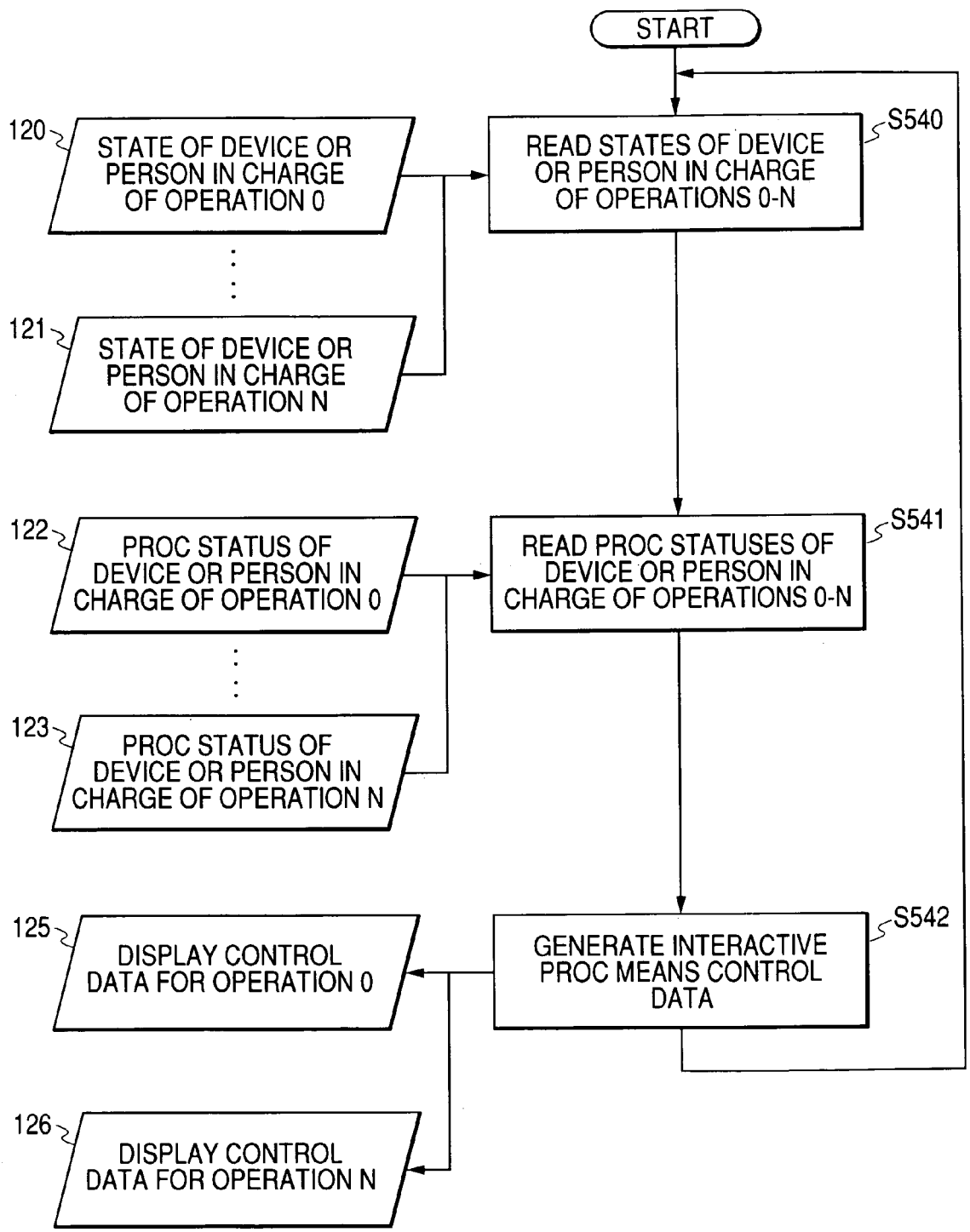
FIG. 19 is a flowchart showing one example of a fifth data processing procedure in the image processing system according to the invention.

Referring to FIG. 19, a display control process for the management server 100 of FIG. 17 to generate the display data will be described.

FIG. 19 is a flowchart showing one example of a fifth data processing procedure in the image processing system according to the invention. This flowchart corresponds to a processing procedure (generation program) for generating the data for controlling the display of each device from the state information of the device in charge of each operation in the management server 100 and the progress status information of the job in execution at present from the device in charge of each operation. S540 to S542 indicate the steps.

The state information of each device in charge of each operation and the process progress status of the job in execution at present in each device in charge of each operation are periodically transmitted to the management server 100 in accordance with the control procedure (program) as shown in FIG. 13. The management server 100 receives and stores them.

First of all, the state information of each device transmitted from each device in charge of each operation is read (S540). Then, the process status information concerning the print job in execution at present in each device that is transmitted from each device in charge of each operation is read in (S541).

And the interactive processing means control data for each device to be employed for display control on the display unit of each device is generated, based on the state information of each device read at step S542 and the process status information concerning the print job in execution at present in each device that is read at step S541, and the procedure returns to step S540.

Figures 20, 21:
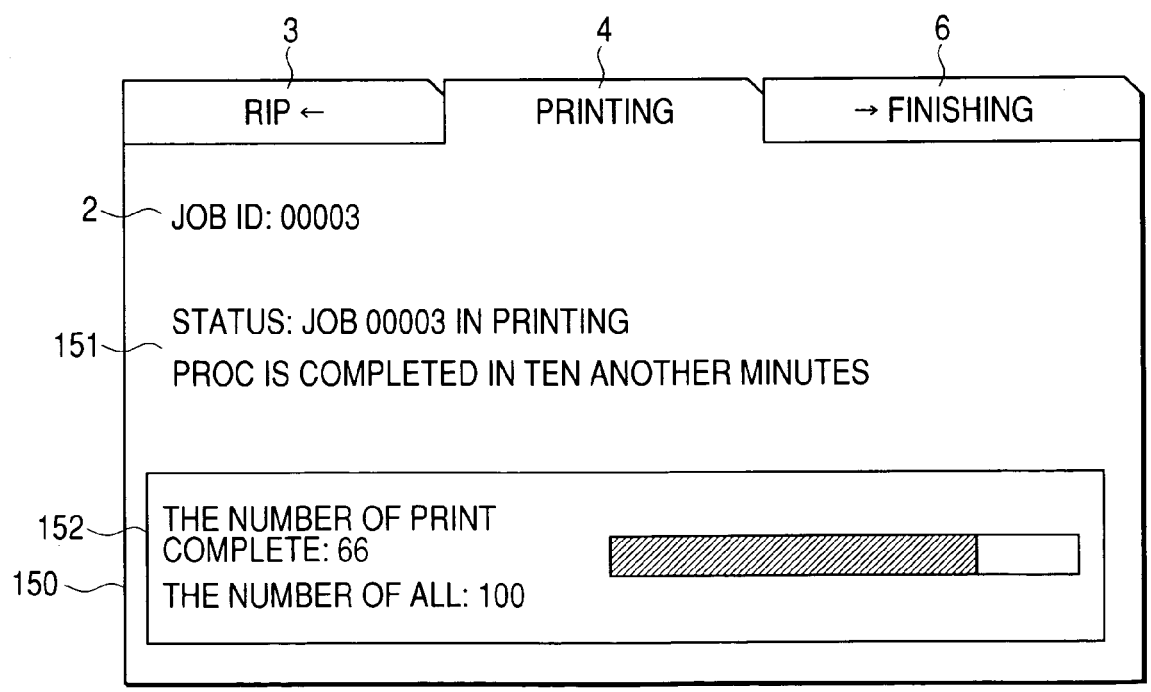
FIG. 20 is a view showing a structure example of interactive processing means control data produced by the management server as shown in FIG. 17.
FIG. 21 is a view showing an operation progress status display example displayed on an operation unit as shown in FIG. 18.

FIG. 20 is a view for explaining a structure example of interactive control means data that is generated in the management server 100 as shown in FIG. 17.

In this embodiment, the interactive processing means control data has a data structure of FIG. 20 that is composed of the data for the device, the device in charge of pre-operation, and the device in charge of post-operation.

Moreover, the display data for each operation includes the job ID of the job in process, the state of device, and the job progress status.

A specific process example of print job requiring, for example, the RIP operation, the print operation and the finishing operation will be described below.

If a print job is transmitted to the management server 100, the management server 100 decides the job ID of the job, generates the processing information for each operation, and transmits the processing information for each operation to the device in charge of each operation in accordance with a control procedure as shown in FIG. 10. They are processing information 111 for a RIP device as shown in FIG. 10, processing information 112 for a printing device, processing information 114 for a finishing device, and the like. The processing information is transmitted via a network 200 to each device.

Also, the management server 100 stores the flow of operation and the information of the processing device in charge of each operation in the storage device. The information corresponds to the flow of operation and the processing device information 115, as shown in FIG. 10. The structure of stored data is the list structure of operation required to complete the print job, as shown in FIG. 15. This list has the operation ID assigned according to the sequence of operations, in which the process content and the device in charge of the process of the operation are defined for each operation.

And the processing information for each operation, which is transmitted from the management server 100 to the device in charge of each operation, is transferred via the network 200 to the RIP device 102, the print device 103 and the finishing-device 105.

The RIP device 102 performs the RIP process based on the received processing information in accordance with a control procedure as shown in FIG. 12. Also, the state information and the process status information of the job in execution are transmitted to the management server 100 in accordance with a program as shown in FIG. 12, irrespective of whether or not the RIP process is being executed. The print device 103 and the finishing device 105 also similarly transmit state information and processing status information of the job being executed for the management server 100.

The management server 100 stores the state information transmitted from the device in charge of each operation and the process status information of the job in execution, generates the display control data 125, 126 for the device in charge of each operation, based on the process state information from the device in charge of each operation and the process status information of the job in execution in accordance with a control procedure as shown in FIG. 19, and transmits it to the corresponding device.

In this display control data 125, 126, the state information and the process status information of the job in execution, which are transmitted from the device in charge of each operation, are successively updated by repeating the steps S540, S541 and S542 in the control procedure as shown in FIG. 19. And the display control data 125, 126 for the device in charge of each operation is transmitted to each device.

Then, each device receives the display control data transmitted from the management server 100, and displays the data on the built-in display unit, based on the display control data. Also, when the operator operates the display unit, the display is switched correspondingly.

For example, in the print device 103, the CPU 141 interprets the display control data received via the network interface 144, generates the display data to be displayed on the operation unit 143, transmits it to the operation unit 143, and displays it on the screen of the operation unit 143, based on the display control data. Also, the CPU 141 makes the control for switching the display in accordance with an input of the operator on the touch panel contained in the display unit.

Herein, an operation progress status display processing example in the operation unit 143 of the print device 103 will be described below.

Figure 22:
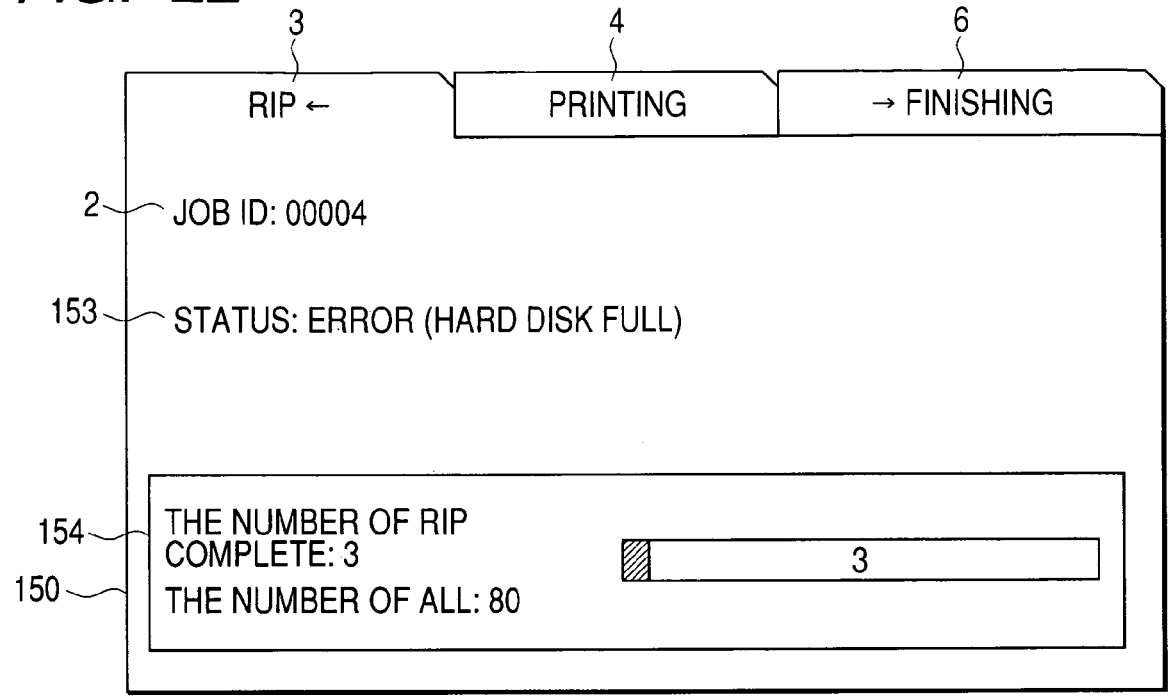
FIG. 22 is a view showing another operation progress status display example displayed on the operation unit as shown in FIG. 18.
Figure 23:
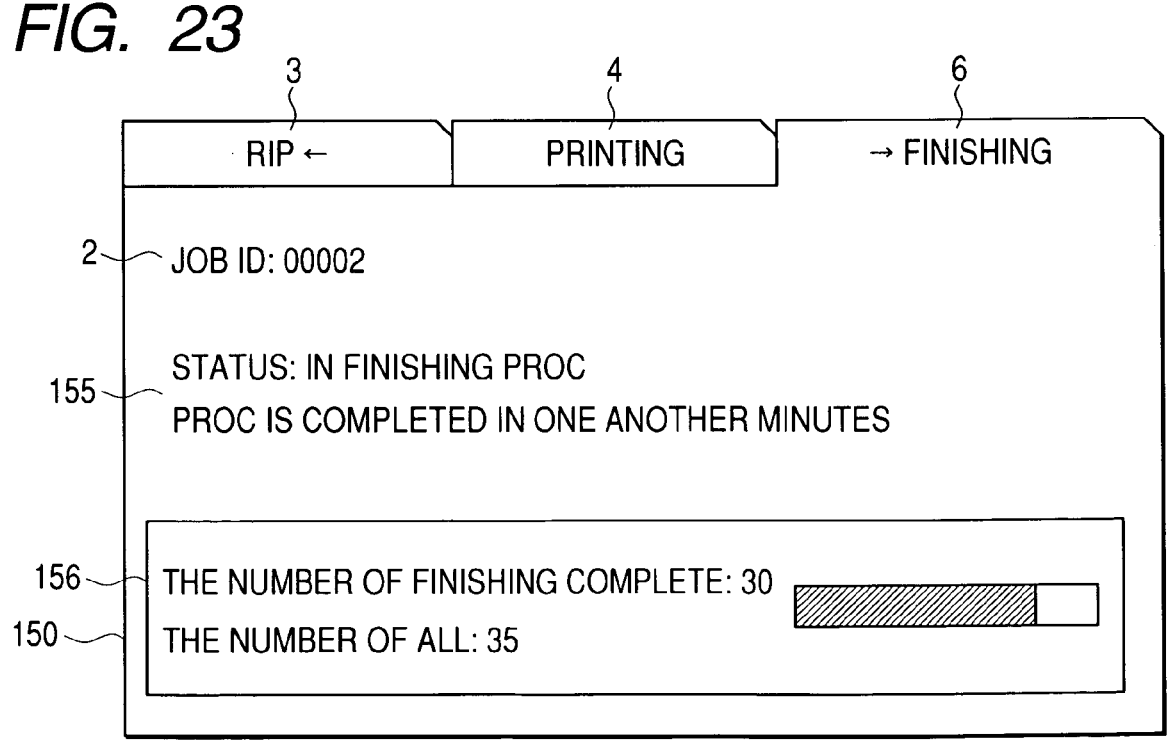
FIG. 23 is a view showing another operation progress status display example displayed on the operation unit as shown in FIG. 18.

FIGS. 21 to 23 are views showing the operation progress status display examples displayed on the operation unit 143 as shown in FIG. 18. FIG. 21 is a screen example in which the operation progress status of the print device 103 is visually displayed on the operation unit 143 of the print device 103.

In FIG. 21, the upper tabs reflect the data structure of interactive processing means control data as shown in FIG. 20, in which the RIP tab 3 for confirming the state of the RIP device as pre-operation, the print tab 4 for confirming the state of the device and the finishing tab 6 for confirming the state of finishing device as post-operation are arranged according to the processing sequence of each print operation.

Also, the job ID display unit 2 displays the job ID of the job in execution at present in the device in charge of the operation, for example, the job ID of the print operation, namely, the print job in process at present in the print device 103 in FIG. 21.

Reference numeral 151 designates an area for displaying the state of the print device 103 as the text, and the progress status of job being executed in the print device 103.

Also, if the RIP tab 3 of FIG. 21 is depressed, the CPU 141 makes the control for switching the display screen to the screen indicating the state of the RIP device 102 in charge of pre-operation of the print device, as shown in FIG. 22.

On the display screen as shown in FIG. 22, reference numeral 153 designates an area for displaying the state of the RIP device 102, and 154 designates an area for displaying the progress status of job being executed in the RIP device 102.

Moreover, if the finishing tab 6 of FIG. 21 is depressed, the CPU 141 makes the control for switching the display screen to the screen indicating the state of the finishing device 105 in charge of post-operation of the print device, as shown in FIG. 23.

In FIG. 23, reference numeral 155 designates an area for displaying the state of the finishing device 105, and 156 designates an area for displaying the progress status of job being executed in the finishing device 105.

The CPU 141 makes the control for these displays based on the interactive processing means control data managed by the management server 100 to display data on the operation unit 143.

In this manner, the operator of the print device 103 makes an operation on the operation unit 143 of the print device 103, and visually confirms, in addition to the state of the print device 103 and the progress status of job being executed in the print device 103, the state of the RIP device 102 as its pre-operation and the progress status of job in execution, and the state of the finishing device 105 as its post-operation and the progress status of job in execution, on the operation unit 143 through a simple operation.

From the above description, according to this embodiment, it is possible to easily confirm the state of the device and the statuses of pre-operation and post-operation by making a check on the operation unit for the device in charge of each operation required to complete the print job. Therefore, it is possible to easily judge whether or not the process is sped up, or there is any time for exchanging the expendables by referring to the statuses of pre-operation and post-operation for the device.

Also, according to this embodiment, since the management server 100 generates the display data for all the devices, there is the specific effect that the systematic user interface can be provided for all the devices.

Third Embodiment

Though in the second embodiment, the management server 100 confirms the progress status of each device on the network 200 or generates the display data (UI data) displayed on the operation unit of each device, the management server 100 may not reside on the network 200 but the communication may be made between devices to generate the data for grasping and displaying the progress status between devices.

In the following, a third embodiment will be described.

Figures 24, 25, 26:
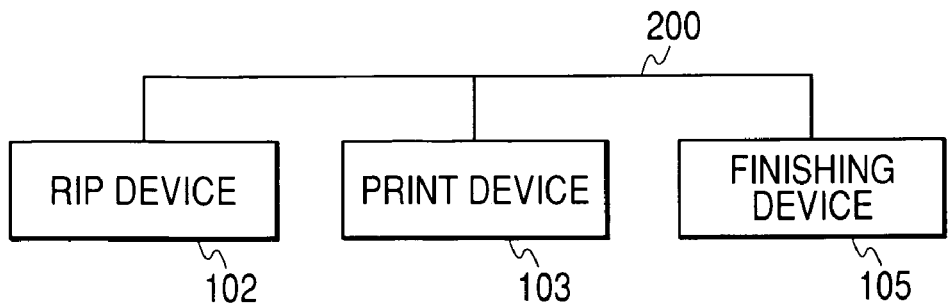
FIG. 24 is a block diagram for explaining the configuration of an image processing system according to a third embodiment of the invention.
FIG. 25 is a view for explaining the data structure of processing information transmitted or received in the image processing system as shown in FIG. 24.
FIG. 26 is a view for explaining the data structure of processing information transmitted or received in the image processing system as shown in FIG. 24.

FIG. 24 is a block diagram for explaining the configuration of an image processing system according to a third embodiment of the invention. The same numerals are attached to the same parts as in FIG. 1. A difference from the configuration of FIG. 1 is that the management server 100 and the management terminal 101 are not connected on the network 200.

In FIG. 24, reference numeral 102 designates an RIP device that receives the processing information for RIP device from an external device, not shown, and generates the image data for printing from the received processing information.

Reference numeral 103 designates a print device that receives the image data generated in the RIP device 102 and forms a print image on the paper. 105 designates a finishing device that cuts or binds the printed matter printed by the print device 103. 200 designates a network that is an information communication path linking the RIP device 102, the print device 103 and the finishing device 105, in which communication is made between devices in accordance with a prescribed protocol periodically or based on a communication schedule between devices.

Though this third embodiment is concerned with a print system for completing an input print job, the input print job has the processing information defining the device in charge of each operation and each process to be executed, the processing information being inputted from an external device or by the operator.

Also, the processing information includes the information for specifying the device in charge of pre-operation for the device in charge of each operation, the information for specifying the device in charge of post-operation, job ID of the job, and the information defining the process content.

FIGS. 25 and 26 are views for explaining the data structure of processing information transmitted or received in the image processing system as shown in FIG. 24.

In this embodiment, a processing information data example includes the host name of pre-operation device on the network, the host name of post-operation device on the network, the job ID of the job, and the definition of process to be executed in the operation, as shown in FIG. 25.

Also, the device in charge of each operation has a function of transmitting the status information having the data structure of FIG. 26 to another device in response to an information transfer request from another device.

In this case, each of the RIP device 102, the print device 103 and the finishing device 105 receives the processing information including the processing information data having the structure as shown in FIG. 25 from the outside.

And each device performs the process in accordance with the received processing information.

On the other hand, each device has display means for displaying the status of pre-operation and post-operation of the operation of which the device is in charge and the state of the device, in which a control program operates to generate the data displayed on the display means. The display means is an operation unit 143 of the print device 103, for example, as explained in the second embodiment. In the following, the acquisition of operation status information for each device and the processing operation of display data will be described in accordance with a control procedure as shown in FIG. 27.

Figure 27:
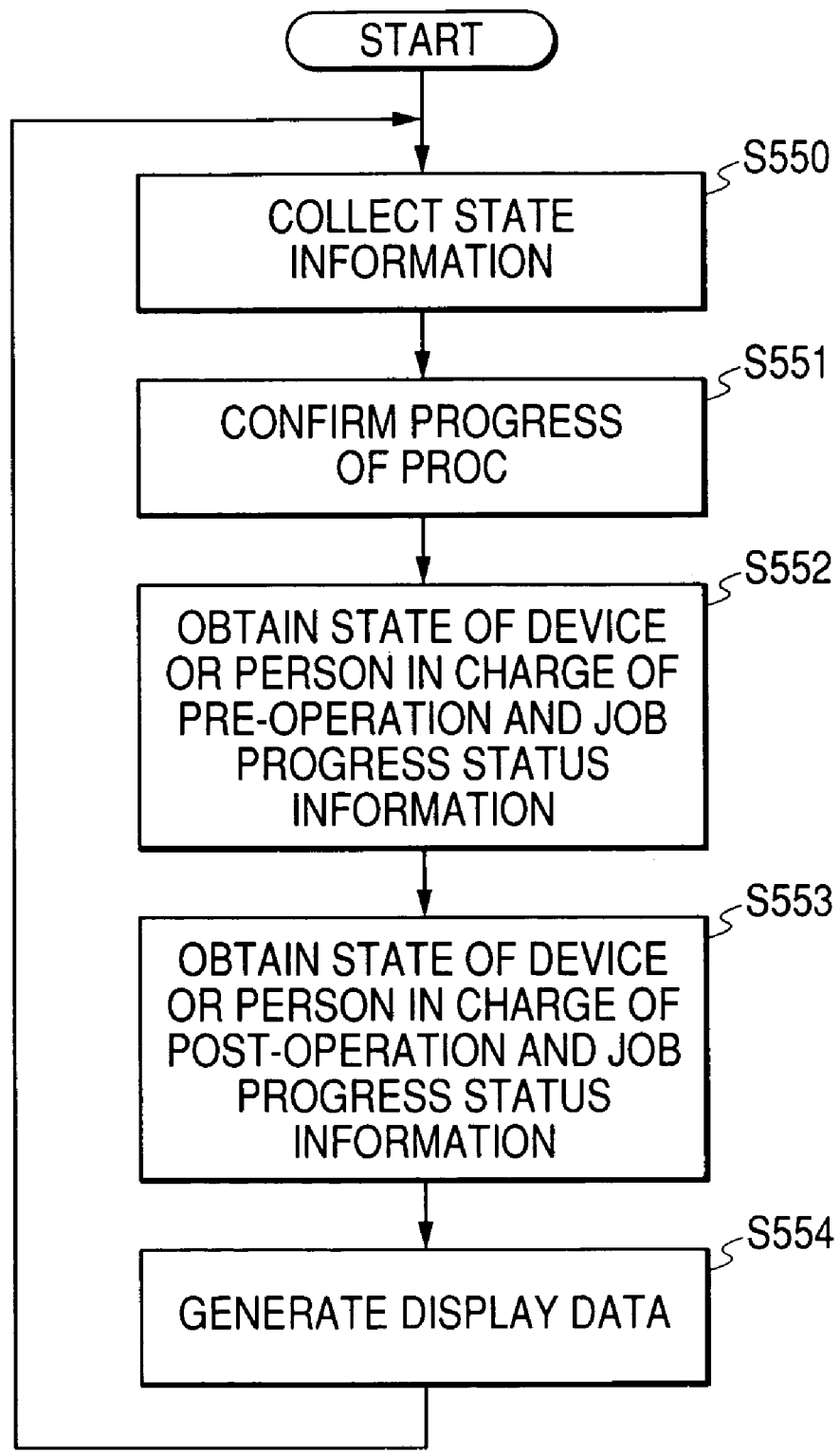
FIG. 27 is a flowchart showing one example of a sixth data processing procedure in the image processing system according to the invention.

FIG. 27 is a flowchart showing an example of a sixth data processing procedure in the image processing system according to the invention. This flowchart corresponds to the acquisition of operation status information for each device and the processing procedure of display data. S550 to S554 indicate the steps.

First of all, the state information of self device is collected (S550). This state information is the information concerning the state of device as to whether or not any error without toner or without paper occurs in the print device 103, for example, and collected by reading the output of various sensors.

Then, the progress status of job in execution at present in the device is confirmed (S551). For example, the total number of pages for the job in execution at present in the print device 103, and the number of completed pages are confirmed.

An information transfer request is issued to the pre-operation device specified by the host name of the pre-operation device on the network that is included in the processing information data inputted externally. The procedure waits for the status information corresponding to the request to be transmitted. And if transmitted, the status information is received (S552).

Then, an information transfer request is issued to the post-operation device specified by the host name of the post-operation device on the network that is included in the processing information data inputted externally. The procedure waits for the status information corresponding to the request to be transmitted. And if transmitted, the status information is received (S553).

And the display data displayed on the operation unit is generated from the state information of the device collected at step S550, the progress status of job in execution at present in the device that is confirmed at step S551, the status information of pre-operation device received at step S552, and the status information of post-operation device received at step S553 (S554), and the procedure returns to step S550.

And the generated display data is sent to the operation unit of each device, for example, and displayed on the operation unit under the control of the CPU of each device.

Under this control, the device in charge of each operation performs the screen display adapted to the operation unit provided for the device to display the statuses of the devices in charge of pre-operation and post-operation in addition to the status of the device.

The screen contents displayed on the operation unit are the status of the device, and the statuses of the device in charge of pre-operation and the device in charge of post-operation, as explained in the second embodiment, in which the contents are displayed in the screen format as shown in FIGS. 21 to 23, for example.

Thereby, the operator can operate the operation unit of the device to confirm the statuses of the devices in charge of pre-operation and post-operation, in addition to the status of the device via the network 200, without the management server 100 and the management terminal 101 residing on the network.

According to this embodiment, even in the case where there is no server for managing the overall system such as the management server, an inexpensive system is constructed in which the device in charge of each operation acquires and displays the statuses from the devices in charge of pre-operation and post-operation.

According to this embodiment, the context of each operation required for the print job, the state of device in charge of each operation, and the progress information in each device, are displayed and easily grasped.

Also, interactive processing means of the device in charge of each operation displays the state of the device and the process status, as well as the states of devices in charge of pre-operation and post-operation and the process statuses, whereby the operator of the device can easily confirm the statuses of the devices in charge of pre-operation and post-operation.

Moreover, even in the case where there is no server for managing the overall system such as the management server, the device in charge of each operation (including at least any one of the devices 101, 102, 103 and 105 of FIG. 1) acquires and displays the statuses from the devices in charge of pre-operation and post-operation.

Figure 28:
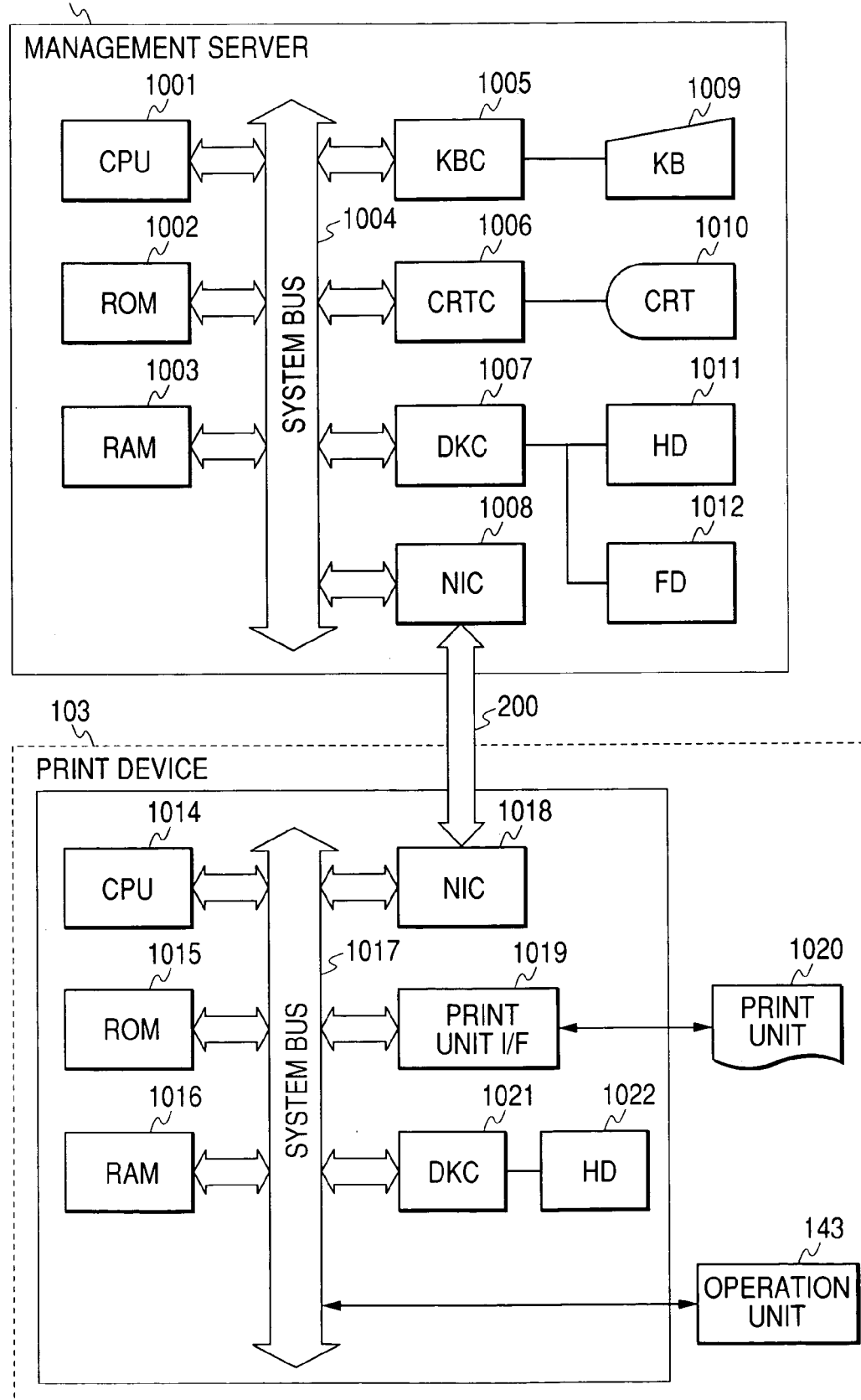
FIG. 28 is a block diagram for explaining one example of the image processing system according to the invention.

FIG. 28 is a block diagram for explaining an example of the image processing system according to the invention. This system example is commonly applicable to each of the embodiments.

In FIG. 28, 100 designates a management server comprising a CPU 1001 for processing the document containing graphics, image, characters and table (including a spreadsheet), based on a document processing program stored in a ROM 1002, in which the CPU 1001 comprehensively controls each device connected to a system bus 1004.

Also, the ROM 1002 stores a control program executed by the CPU 1001 of the management server 100 in the above-described flowchart. Reference numeral 1003 designates a RAM that functions as a main memory or a work memory for the CPU 1001.

Reference numeral 1005 designates a keyboard controller (KBC) for controlling a key input from a keyboard (KB) 1009. 1006 designates a CRT controller (CRTC) for controlling the display (including the screen display as shown in FIGS. 3 to 9) of a CRT display (CRT) 1010. 1007 designates a disk controller (DKC) for controlling the access to a hard disk (HD) 1011 and a flexible disk (FD) 1012, which store a boot program, various applications, font data, a user file and an edit file.

Reference numeral 1008 designates a network controller (NIC) connected via the network 200 to the print device 103, in which the network controller performs a communication control process with the print device 103.

Also, the CPU 1001 performs various data processes by opening various registered windows upon a command instructed by the mouse cursor on the CRT 1010.

In the printer 103, reference numeral 1014 designates a printer CPU (CPU) that comprehensively controls the access to various devices connected to a system bus 1017, based on a control program stored in the ROM 1015, and outputs an image signal as print data to a print unit (printer engine) 1020 connected via a print unit interface 1019.

Also, this ROM 1015 stores a control program (including communication with each device and the management server 100 or management terminal 101) executed by the CPU 1014 of the print device 103 in the above flowchart.

The print device 103 receives the image data expanded from the RIP device 102 as shown in FIG. 1 and performs the printing process.

Reference numeral 1016 designates a RAM that functions as a main memory or a work memory of the CPU 1014, in which the memory capacity can be expanded by an optional RAM connected to an extension port, not shown. The RAM 1016 is employed as a recording data expansion area, an environment data storage area, and NVRAM. Also, the disk controller (DKC) 1021 controls the access to a hard disk 1022.

Also, the operation unit 143 displays the data process status between devices based on the screen image generated through the communication process with each device by the CPU 1014 in the third embodiment.

Moreover, the CPU 1014 generates the information indicating the data process status of the self device in accordance with the data structure as above described and transfers it to each device connected on the network 200.

Referring to a memory map of FIG. 29, the configuration a data processing program readable in the image processing system according to the invention will be described below.

FIG. 29 is a view for explaining the memory map of a storage medium storing various data processing programs readable in the image processing system according to the invention.

Though not being specifically shown, the information for managing a group of programs stored in the storage medium, for example, version information and creator name, are stored, and the information dependent on the OS on the program reading side, for example, the icons graphically displaying the program, may be stored.

Moreover, the data dependent on various programs is managed in the directory. Also, a program for installing various programs into the computer, and a thawing program when the installed program is compressed may be stored.

The functions as shown in FIGS. 10, 12, 13, 14, 19 and 27 in this embodiment may be implemented in a host computer using the program installed externally. In this case, this invention is also applicable when a group of information including the programs is supplied to the output device via a storage medium such as CD-ROM, flash memory or FD, or from an external storage medium via the network.

In this manner, a storage medium storing the program code of software for implementing the functions of the above embodiments may be supplied to the system or device to enable the computer (or CPU or MPU) for the system or device to read and execute the program code stored in the storage medium, whereby the object of the invention is also achieved.

In this case, the program code itself read from the storage medium realizes the new functions of the invention, and the storage medium storing the program code constitutes the invention.

Accordingly, the program may be provided in any form of object code program executed by interpreter or script data supplied to the OS, as far as the program fulfills the function.

The storage medium for supplying the program may be a flexible disk, a hard disk, an optical disk, an optical magnetic disk, MO, CD-ROM, CD-R, CD-RW, a magnetic tape, a non-volatile memory card, ROM or DVD.

In this case, the program code itself read from the storage medium implements the functions of the above embodiments, and the storage medium storing the program code constitutes the invention.

Besides, the supply method of the program may involve connecting to a home page of the internet, employing the browser of a client computer, and downloading a computer program itself of the invention, or a compressed file containing automatic installing function from the home page into the storage medium such as hard disk. Also, the program code constituting the program of the invention may be divided into a plurality of files, and each file may be downloaded from different home page. That is, a WWW server or ftp server that allows a program file for implementing the functional process of the invention on the computer to be downloaded into a plurality of users may be contained in the claims of the invention.

Also, the program of the invention may be encrypted, stored in the storage medium such as CD-ROM, and delivered to the user, in which the key information for decrypting the encrypted code is downloaded via the internet from the home page to the user who clears the predetermined conditions, and the encrypted program is executed employing the key information, and installed into the computer.

Also, the program code read by the computer may be executed to implement the functions of the above embodiments, or the OS (operating system) operating on the computer may perform all or part of the process, based on instructions of the program code, to implement the functions of the above embodiments.

Moreover, after the program code read from the storage medium is written into a memory equipped in a function extension board inserted into the computer or a function extension unit connected to the computer, the CPU provided for the function extension board or function extension unit may perform all or par of the actual process in accordance with instructions of the program code to implement the functions of the above embodiments.

The invention is not limited to the above embodiments, but various variations (including an organic combination of the embodiments) may be made thereto without departing from the spirit or scope of the invention.

Though several embodiments of the invention have been described below by way of example, it will be appreciated to a person skilled in the art that the spirit or scope of the invention is not limited to the specific description of this specification.

As described above, with the invention, it is possible to prevent the problems associated with the prior art, and easily construct a user-friendly system. Also, the user of each processing device mutually monitors the progress status of each processing device in one series of processing operations that consist of a plurality of processing operations performed by a plurality of processing devices, whereby the person in charge visually confirms the progress status of one series of processing operations as the entire system to manage the process status of each operation as divided work at will, while checking the progress status of each processing device itself clearly, thereby giving rise to the effect that the processing efficiency of the system is greatly improved.

This invention is not limited to the above embodiments, but various variations may be made thereto without departing from the spirit or scope of the invention.

This application claims priority from Japanese Patent Application No. 2003-403153 filed Dec. 2, 2003, which is hereby incorporated by reference herein.

What is claimed is:

1. A print system comprising a plurality of processing devices for performing a plurality type of print-related processes sequentially for completing one job and a management server which communicates with the plurality of processing devices, wherein said plurality of processing devices are respectively individual devices which are connected through a network, wherein said management server comprises:
an acquisition unit constructed to acquire an information of the plurality type of print-related processes of the plurality of processing devices;
a generation unit constructed to generate display data for displaying on a display unit of each said processing device based on the information of the print-related process acquired by said acquisition unit,
wherein said generation unit corresponds to said plurality of processing devices respectively and generates the plurality of display data of different contents respectively to the corresponding processing devices based on order of the print-related processes performed by the corresponding processing devices to complete the job in the print system, and the display data is composed of information indicating a job performed by a first processing device on which the display data is displayed, basic display data including a progress of the job performed by said first processing device and a status of said first processing device, information indicating a job performed by a second processing device of performing a one-pre-process of a process to be performed by said first processing device on which the display data is displayed, pre-operation display data including a progress of the job performed by said second processing device and a status of said second processing device, information indicating a job performed by a third processing device of performing a one-post-process of the process to be performed by said first processing device on which the display data is displayed, and post-operation display data including a progress of the job performed by said third processing device and a status of said third processing device,
the display data includes only the basic display data including the progress of the job performed by said first processing device and the status of said first processing device, the information indicating the job performed by said second processing device of performing the one-pre-process of the process to be performed by said first processing device on which the display data is displayed, the pre-operation display data including the progress of the job performed by said second processing device and the status of said second processing device, the information indicating the job performed by said third processing device of performing the one-post-process of the process to be performed by said first processing device on which the display data is displayed, and the post-operation display data including the progress of the job performed by said third processing device and the status of said third processing device, and
the display data does not include information which concerns the processing devices of performing the pre-processes of the process to be performed by said second processing device and the processing devices of performing the post-processes of the process to be performed by said third processing device; and
a transmission unit constructed to respectively transmit the plurality of display data generated by said generation unit to, among the plurality of processing devices, the processing device corresponding to the content of the display data to be transmitted, wherein each said processing device comprises:
a display unit;
a notification unit constructed to transmit information of the print-related process indicating the process status in a current process and state information of each said processing device; and
a control unit constructed to control said display unit to display the display data transmitted by said management server.

2. A print system according to claim 1, wherein the status of said first processing device included in the basic display data includes error information of said first processing device, the status of said second processing device included in the pre-operation display data includes error information of said second processing device, and the status of said third processing device included in the post-operation display data includes error information of said third processing device.

3. A print system comprising a management terminal, a management server and a plurality of processing devices for performing a plurality type of print-related processes sequentially for completing one job, wherein the management server communicates with the management terminal and all of said processing devices, wherein said plurality of processing devices are respectively individual devices which are connected through a network, wherein said management server comprises:
an acquisition unit constructed to acquire an information of the plurality type of print-related processes of the plurality of processing devices;
a generation unit constructed to generate display data for displaying on a display unit of each of said processing devices, based on the information of a print-related process acquired by said acquisition unit,
wherein said generation unit corresponds to said plurality of processing devices respectively and generates the plurality of display data of different contents respectively to the corresponding processing devices based on order of the print-related processes performed by the corresponding processing devices to complete the job in the print system, and the display data is composed of information indicating a job performed by a first processing device on which the display data is displayed, basic display data including a progress of the job performed by said first processing device and a status of said first processing device, information indicating a job performed by a second processing device of performing a one-pre-process of a process to be performed by said first processing device on which the display data is displayed, pre-operation display data including a progress of the job performed by said second processing device and a status of said second processing device, information indicating a job performed by a third processing device of performing a one-post-process of the process to be performed by said first processing device on which the display data is displayed, and post-operation display data including a progress of the job performed by said third processing device and a status of said third processing device, the display data includes only the basic display data including the progress of the job performed by said first processing device and the status of said first processing device, the information indicating the job performed by said second processing device of performing the one-pre-process of the process to be performed by said first processing device on which the display data is displayed, the pre-operation display data including the progress of the job performed by said second processing device and the status of said second processing device, the information indicating the job performed by said third processing device of performing the one-post-process of the process to be performed by said first processing device on which the display data is displayed, and the post-operation display data including the progress of the job performed by said third processing device and the status of said third processing device, and the display data does not include information which concerns the processing devices of performing the pre-processes of the process to be performed by said second processing device and the processing devices of performing the post-processes of the process to be performed by said third processing device; and a transmission unit constructed to respectively transmit the plurality of display data generated by said generation unit to, among the plurality of processing devices, the processing device corresponding to the content of the display data to be transmitted, wherein said management terminal comprises:
  a display unit; and
  a control unit constructed to control said display unit to display the display data transmitted by said management server.

4. A print system according to claim 3, wherein the status of said first processing device included in the basic display data includes error information of said first processing device, the status of said second processing device included in the pre-operation display data includes error information of said second processing device, and the status of said third processing device included in the post-operation display data includes error information of said third processing device.

5. A print system in which a plurality of processing devices communicate to perform a plurality types of print-related processes sequentially for completing one job, wherein each said processing device comprises:
  a display unit;
  a reception unit constructed to accept a transmission of processing information of a print-related process;
  a generation unit constructed to generate display data for displaying on a display unit of said processing device, based on the information of each print-related process acquired by said acquisition unit,
  wherein said generation unit corresponds to said plurality of processing devices respectively and generates the plurality of display data of different contents respectively to the corresponding processing devices based on order of the print-related processes performed by the corresponding processing devices to complete the job in the print system, and the display data is composed of information indicating a job performed by a first processing device on which the display data is displayed, basic display data including a progress of the job performed by said first processing device and a status of said first processing device, information indicating a job performed by a second processing device of performing a one-pre-process of a process to be performed by said first processing device on which the display data is displayed, pre-operation display data including a progress of the job performed by said second processing device and a status of said second processing device, information indicating a job performed by a third processing device of performing a one-post-process of the process to be performed by said first processing device on which the display data is displayed, and post-operation display data including a progress of the job performed by said third processing device and a status of said third processing device, the display data includes only the basic display data including the progress of the job performed by said first processing device and the status of said first processing device, the information indicating the job performed by said second processing device of performing the one-pre-process of the process to be performed by said first processing device on which the display data is displayed, the pre-operation display data including the progress of the job performed by said second processing device and the status of said second processing device, the information indicating the job performed by said third processing device of performing the one-post-process of the process to be performed by said first processing device on which the display data is displayed, and the post-operation display data including the progress of the job performed by said third processing device and the status of said third processing device, and the display data does not include information which concerns the processing devices of performing the pre-processes of the process to be performed by said second processing device and the processing devices of performing the post-processes of the process to be performed by said third processing device; and a transmission unit constructed to respectively transmit the plurality of display data generated by said generation unit to, among the plurality of processing devices, the processing device corresponding to the content of the display data to be transmitted;

a notification unit constructed to transmit information of the print-related process indicating the process status in a current process and state information of said processing device; and a control unit constructed to control said display data unit to display the display data transmitted by said management server.

6. A print system according to claim 5, wherein each said processing device comprises an acceptance unit constructed to accept a progress display switching instruction to respective processing devices concerning a pre-operation and a post-operation in one series of print-related processes by the user, in which said control unit accepts said switching instruction by said acceptance unit to acquire the display data transmitted from each said processing device, and display and switch dynamically the progress status of each processing device in linkage with a processing device instructed among said plurality of processing devices on said display unit.

7. A print system according to claim 5, wherein said print-related processes comprise at least a raster image generation operation, a print operation for printing the raster image generated by said raster image generation operation, and a post-processing operation for performing a predetermined post-processing for the printed matter outputted from said print operation.

8. A print system according to claim 5, wherein said print-related processes comprise at least a raster image generation operation, a print operation for printing the raster image generated by said raster image generation operation, a delivery operation for delivering the printed matter outputted from said print operation to a station for performing the post-processing, and a post-processing operation for performing a predetermined post-processing for the printed matter delivered from said delivery operation.

9. A print system according to claim 5, wherein the status of said first processing device included in the basic display data includes error information of said first processing device, the status of said second processing device included in the pre-operation display data includes error information of said second processing device, and the status of said third processing device included in the post-operation display data includes error information of said third processing device.

10. A progress display processing method for use with a print system in which a plurality of processing devices for performing a plurality type of print-related processes sequentially for completing one job and a management server communicate with each other, wherein said plurality of processing devices are respectively individual devices which are connected through a network,
wherein said management server executes:
a generation step of generating display data for displaying on a display unit of said processing device based on the information of the print-related process acquired by said acquisition unit,
wherein said generation unit corresponds to said plurality of processing devices respectively and generates the plurality of display data of different contents respectively to the corresponding processing devices based on order of the print-related processes performed by the corresponding processing devices to complete the job in the print system, and the display data is composed of information indicating a job performed by a first processing device on which the display data is displayed, basic display data including a progress of the job performed by said first processing device and a status of said first processing device, information indicating a job performed by a second processing device of performing a one-pre-process of a process to be performed by said first processing device on which the display data is displayed, pre-operation display data including a progress of the job performed by said second processing device and a status of said second processing device, information indicating a job performed by a third processing device of performing a one-post-process of the process to be performed by said first processing device on which the display data is displayed, and post-operation display data including a progress of the job performed by said third processing device and a status of said third processing device,
the display data includes only the basic display data including the progress of the job performed by said first processing device and the status of said first processing device, the information indicating the job performed by said second processing device of performing the one-pre-process of the process to be performed by said first processing device on which the display data is displayed, the pre-operation display data including the progress of the job performed by said second processing device and the status of said second processing device, the information indicating the job performed by said third processing device of performing the one-post-process of the process to be performed by said first processing device on which the display data is displayed, and the post-operation display data including the progress of the job performed by said third processing device and the status of said third processing device, and
the display data does not include information which concerns the processing devices of performing the pre-processes of the process to be performed by said second processing device and the processing devices of performing the post-processes of the process to be performed by said third processing device; and
a transmission step of respectively transmitting the plurality of display data generated by said generation unit to, among the plurality of processing devices, the processing device corresponding to the content of the display data to be transmitted,
wherein each said each processing device executes:
a notification step of transmitting information of the print-related process indicating the process status in a current process and state information of said such processing device; and
a control step of controlling said display unit to display the display data transmitted by said management server.

11. A print method according to claim 10, wherein the status of said first processing device included in the basic display data includes error information of said first processing device, the status of said second processing device included in the pre-operation display data includes error information of said second processing device, and the status of said third processing device included in the post-operation display data includes error information of said third processing device.

12. A progress display processing method for use with a print system in which a management terminal, a management server and a plurality of processing devices, wherein said plurality of processing devices are respectively individual devices which are connected through a network,
wherein said management server executes:
a transmission step of transmitting the processing information of a print-related process to any of the processing devices,
a generation step of generating display data for displaying on a display unit of each of said processing devices based on the information of the print-related process acquired by of said acquisition unit,
wherein said generation unit corresponds to said plurality of processing devices respectively and generates the plurality of display data of different contents respectively to the corresponding processing devices based on order of the print-related processes performed by the corresponding processing devices to complete the job in the print system, and the display data is composed of information indicating a job performed by a first processing device on which the display data is displayed, basic display data including a progress of the job performed by said first processing device and a status of said first processing device, information indicating a job performed by a second processing device of performing a one-pre-process of a process to be performed by said first processing device on which the display data is displayed, pre-operation display data including a progress of the job performed by said second processing device and a status of said second processing device, information indicating a job performed by a third processing device of performing a one-post-process of the process to be performed by said first processing device on which the display data is displayed, and post-operation display data including a progress of the job performed by said third processing device and a status of said third processing device, the display data includes only the basic display data including the progress of the job performed by said first processing device and the status of said first processing device, the information indicating the job performed by said second processing device of performing the one-pre-process of the process to be performed by said first processing device on which the display data is displayed, the pre-operation display data including the progress of the job performed by said second processing device and the status of said second processing device, the information indicating the job performed by said third processing device of performing the one-post-process of the process to be performed by said first processing device on which the display data is displayed, and the post-operation display data including the progress of the job performed by said third processing device and the status of said third processing device, and the display data does not include information which concerns the processing devices of performing the pre-processes of the process to be performed by said second processing device and the processing devices of performing the post-processes of the process to be performed by said third processing device; and a transmission step of respectively transmitting the plurality of display data generated by said generation unit to, among the plurality of processing devices, the processing device corresponding to the content of the display data to be transmitted, and wherein each said management terminal executes:

a control step of controlling said display unit to display the display data transmitted by said management server.

13. A print method according to claim 12, wherein the status of said first processing device included in the basic display data includes error information of said first processing device, the status of said second processing device included in the pre-operation display data includes error information of said second processing device, and the status of said third processing device included in the post-operation display data includes error information of said third processing device.

14. A progress display processing method for use with a print system in which a plurality of processing devices communicate to perform a plurality types of print-related processes, wherein said plurality of processing devices are respectively individual devices which are connected through a network, wherein each said processing device executes:

a generation step of generating display data for displaying on a display unit of each of said processing devices, based on the information of a print-related process acquired by of said acquisition unit, wherein said generation unit corresponds to said plurality of processing devices respectively and generates the plurality of display data of different contents respectively to the corresponding processing devices based on order of the print-related processes performed by the corresponding processing devices to complete the job in the print system, and the display data is composed of information indicating a job performed by a first processing device on which the display data is displayed, basic display data including a progress of the job performed by said first processing device and a status of said first processing device, information indicating a job performed by a second processing device of performing a one-pre-process of a process to be performed by said first processing device on which the display data is displayed, pre-operation display data including a progress of the job performed by said second processing device and a status of said second processing device, information indicating a job performed by a third processing device of performing a one-post-process of the process to be performed by said first processing device on which the display data is displayed, and post-operation display data including a progress of the job performed by said third processing device and a status of said third processing device, the display data includes only the basic display data including the progress of the job performed by said first processing device and the status of said first processing device, the information indicating the job performed by said second processing device of performing the one-pre-process of the process to be performed by said first processing device on which the display data is displayed, the pre-operation display data including the progress of the job performed by said second processing device and the status of said second processing device, the information indicating the job performed by said third processing device of performing the one-post-process of the process to be performed by said first processing device on which the display data is displayed, and the post-operation display data including the progress of the job performed by said third processing device and the status of said third processing device, and the display data does not include information which concerns the processing devices of performing the pre-processes of the process to be performed by said second processing device and the processing devices of performing the post-processes of the process to be performed by said third processing device; and a transmission step of respectively transmitting the plurality of display data generated by said generation unit to, among the plurality of processing devices, the processing device corresponding to the content of the display data to be transmitted;

a notification step of transmitting information of the print-related process indicating the process status in a current process and the state information of each said processing device; and a control step of controlling said display unit to display the display data transmitted by said management server.

15. A progress display processing method according to claim 14, wherein each said processing device comprises an acceptance step of accepting a progress display switching instruction to respective processing devices concerning a pre-operation and a post-operation in one series of print-related processes by the user, in which said control step comprises accepting said switching instruction at said acceptance step to acquire the display data transmitted from each said processing device, and display and switch dynamically the progress status of each processing device in linkage with a processing device instructed among said plurality of processing devices on said display unit.

16. A progress display processing method according to claim 14, wherein said print-related processes comprise at least a raster image generation operation, a print operation for printing the raster image generated by said raster image generation operation, and a post-processing operation for performing a predetermined post-processing for the printed matter outputted from said print operation.

17. A progress display processing method according to claim 14, wherein said print-related processes comprise at least a raster image generation operation, a print operation for printing the raster image generated by said raster image generation operation, a delivery operation for delivering the printed matter outputted from said print operation to a station for performing the post-processing, and a post-processing operation for performing a predetermined post-processing for the printed matter delivered from said delivery operation.

18. A print method according to claim 14, wherein the status of said first processing device included in the basic display data includes error information of said first processing device, the status of said second processing device included in the pre-operation display data includes error information of said second processing device, and the status of said third processing device included in the post-operation display data includes error information of said third processing device.

* * * * *